US011822054B2

(12) United States Patent
Uenoyama et al.

(10) Patent No.: US 11,822,054 B2
(45) Date of Patent: Nov. 21, 2023

(54) METASURFACE STRUCTURE AND METHOD FOR PRODUCING METASURFACE STRUCTURE

(71) Applicant: HAMAMATSU PHOTONICS K.K., Hamamatsu (JP)

(72) Inventors: Soh Uenoyama, Hamamatsu (JP); Yuu Takiguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 580 days.

(21) Appl. No.: 17/052,249

(22) PCT Filed: Apr. 11, 2019

(86) PCT No.: PCT/JP2019/015847
§ 371 (c)(1),
(2) Date: Nov. 2, 2020

(87) PCT Pub. No.: WO2019/216113
PCT Pub. Date: Nov. 14, 2019

(65) Prior Publication Data
US 2021/0055456 A1    Feb. 25, 2021

(30) Foreign Application Priority Data

May 8, 2018    (JP) .................... 2018-089820

(51) Int. Cl.
*G02B 1/02* (2006.01)
*G02B 1/00* (2006.01)
(Continued)

(52) U.S. Cl.
CPC ............... *G02B 1/02* (2013.01); *C03C 15/00* (2013.01); *C03C 17/09* (2013.01); *G02B 1/00* (2013.01);
(Continued)

(58) Field of Classification Search
CPC .. G02B 1/02; G02B 1/002; G02B 1/00; C03C 15/00; C03C 17/09; H01Q 1/2283; H01Q 1/22
(Continued)

(56) References Cited

U.S. PATENT DOCUMENTS

| 2014/0044392 A1* | 2/2014 | Fattal ................. G02B 6/12002 |
| | | 385/37 |
| 2014/0263982 A1 | 9/2014 | Shkunov et al. |

(Continued)

FOREIGN PATENT DOCUMENTS

| CN | 103547956 A | 1/2014 |
| JP | 2015-092234 A | 5/2015 |
| TW | 201235621 A | 9/2012 |

OTHER PUBLICATIONS

International Preliminary Report on Patentability dated Nov. 19, 2020 for PCT/JP2019/015847.
(Continued)

*Primary Examiner* — Hai V Tran
(74) *Attorney, Agent, or Firm* — Faegre Drinker Biddle & Reath LLP

(57) ABSTRACT

The present disclosure relates to a metasurface structural body or the like having a structure for achieving desired optical characteristics. The metasurface structural body includes a base member having a first surface and a second surface opposing each other, and a plurality of antennas as a plurality of fine structures arranged along the first surface. The base member has a base portion and an adjacent portion. The antennas each has a first refractive index and an antenna end surface constituting a part of the first surface. The adjacent portion is provided such that a part thereof is positioned between the antennas, the adjacent portion having a second refractive index different from the first refractive index and an adjacent-portion end surface constituting
(Continued)

a remaining part of the first surface. The antenna end surfaces and the adjacent-portion end surface form a flat surface as the first surface.

10 Claims, 15 Drawing Sheets

(51) Int. Cl.
*C03C 15/00* (2006.01)
*H01Q 1/22* (2006.01)
*C03C 17/09* (2006.01)

(52) U.S. Cl.
CPC ............... *G02B 1/002* (2013.01); *H01Q 1/22* (2013.01); *H01Q 1/2283* (2013.01)

(58) Field of Classification Search
USPC .......................................................... 343/721
See application file for complete search history.

(56) References Cited

U.S. PATENT DOCUMENTS

| 2015/0090862 | A1 | 4/2015 | Matsui et al. | |
|---|---|---|---|---|
| 2016/0353039 | A1 | 12/2016 | Rephaeli et al. | |
| 2017/0235162 | A1* | 8/2017 | Shaltout | G02B 1/002 359/9 |
| 2018/0074227 | A1* | 3/2018 | Nomoto | G02B 1/002 |
| 2018/0109002 | A1* | 4/2018 | Foo | H01Q 19/19 |
| 2019/0379118 | A1* | 12/2019 | Rmili | H01Q 21/08 |
| 2020/0373678 | A1* | 11/2020 | Park | H01P 3/121 |
| 2021/0048692 | A1* | 2/2021 | Sakai | G02F 1/133553 |
| 2021/0050515 | A1* | 2/2021 | Falk | H10N 70/883 |

OTHER PUBLICATIONS

Chong, Katie Eve, "Optically-Induced Magnetic Response in All-Dielectric Nanodisk Composite Structures," Australian National University, 2017.

Decker, Manuel, et al., "High-efficiency light-wave control with all-dielectric optical Huygens' metasurfaces," Advanced Optical Materials, 2015, 3, 17 pages.

Huang, Lingling, et al., "Dispersionless Phase Discontinuities for Controlling Light Propagation," Nano Letters, 2012, 12, p. 5750-p. 5755.

Kamali , Seyedeh M., et al., "Decoupling optical function and geometrical form using conformal flexible dielectric metasurfaces," Nature Communications, 2016, 7, 11618, p. 1-p. 6.

Lalanne, Philippe, et al., "Design and fabrication of blazed binary diffractive elements with sampling periods smaller than the structural cutoff," Journal of the Optical Society of America A, 1999, 16(5), p. 1143-p. 1156.

Monticone, Francesco, et al., "Full Control of Nanoscale Optical Transmission with a Composite Metascreen," Physical Review Letters, 110, 2013, p. 203903-1-p. 203903-5.

Sun, Shulin, et al., "High-Efficiency Broadband Anomalous Reflection by Gradient Meta-Surfaces," Nano Letters, 2012, 12, pp. 6223-6229.

Yu, Nanfang et al., "Light Propagation with Phase Discontinuities: Generalized Laws of Relection and Refraction," Science, vol. 334, Oct. 21, 2011, pp. 333-337.

* cited by examiner

METASURFACE STRUCTURE AND METHOD FOR PRODUCING METASURFACE STRUCTURE

TECHNICAL FIELD

The present disclosure relates to a metasurface structural body and a method for manufacturing a metasurface structural body.

BACKGROUND ART

A metasurface structural body that functions as an optical element by including a plurality of fine structures arranged at a predetermined pitch has been known. For example, Non Patent Literature 1 discloses a structural body in which silicon fine structures are arranged on a substrate such as glass and then a material of the same type as the substrate is further stacked. In this structural body, a material of the same type as the substrate is provided so as to bury spaces between the fine structures, and is also provided on the fine structures. Note that, the "pitch" is defined by a distance between centers of gravity in the fine structures adjacent to each other at the shortest distance.

CITATION LIST

Non Patent Literature

Non Patent Literature 1: Katie Eve Chong, "Optically-Induced Magnetic Response in All-Dielectric Nanodisk Composite Structures", Australian National University, 2017.
Non Patent Literature 2: Nanfang Yu et al., "Light Propagation with Phase Discontinuities: Generalized Laws of Reflection and Refraction", Science, 2011, 334, 333.
Non Patent Literature 3: S. Sun et al., "High-efficiency broadband anomalous reflection by gradient meta-surfaces", Nano Letters, 2012, 12, 6223.
Non Patent Literature 4: Francesco Monticone et al., "Full Control of Nanoscale Optical Transmission with a Composite Metascreen", Physical Review Letters, 2013, 110, 203903.
Non Patent Literature 5: Lingling Huang et al., "Dispersionless Phase Discontinuities for Controlling Light Propagation", Nano Letters, 2012, 12, 5750.
Non Patent Literature 6: Manuel Decker et al., "High-efficiency light-wave control with all-dielectric optical Huygens' metasurfaces", Advanced Optical Materials, 2015, 3, 813.
Non Patent Literature 7: Seyedeh M. Kamali et al., "Decoupling optical function and geometrical form using conformal flexible dielectric metasurfaces", Nature Communications, 2016, 7, 11618.
Non Patent Literature 8: Philippe Lalanne et al., "Design and fabrication of blazed binary diffractive elements with sampling periods smaller than the structural cutoff", Journal of the Optical Society of America A, 1999, 16(5), 1143.

SUMMARY OF INVENTION

Technical Problem

The inventors have found the following problems as a result of examining the above-mentioned related arts. That is, in the structural body disclosed in Non Patent Literature 1, since the material of the same type as the substrate has a front surface on which irregularities corresponding to the arrangement of the fine structures are formed, transmitted light is scattered. Accordingly, the transmitted light travels in irregular directions, and thus, it is difficult to achieve desired optical characteristics. In this structural body, since the material of the same type as the substrate is provided on the fine structures, the selection of the material on the front surface of the structural body is restricted, and it is more difficult to achieve the desired optical characteristics.

The present disclosure has been made to solve the above-mentioned problems, and an object of the present disclosure is to provide a metasurface structural body including structures for achieving desired optical characteristics and a method for manufacturing a metasurface structural body.

Solution to Problem

A metasurface structural body according to an aspect of the present disclosure is an optical element that has a first surface and a second surface opposing each other and has a plurality of fine structures arranged along the first surface. The metasurface structural body includes a base member and a plurality of antennas. The base member is provided between the first surface and the second surface. The base member has a base portion and an adjacent portion provided between the first surface and the base portion. The plurality of antennas are provided as the plurality of fine structures between the first surface and the base portion. Each of the plurality of antennas has a first refractive index and an antenna end surface constituting a part of the first surface. The adjacent portion is provided between the first surface and the base portion such that a part of the adjacent portion is positioned between the plurality of antennas. The adjacent portion has a second refractive index different from the first refractive index, and constitutes a remaining part of the first surface. In the metasurface structural body, the plurality of antenna end surfaces and the adjacent-portion end surface constitute a flat surface as the first surface. Note that, the "flat surface" means a surface in which an edge of the antenna end surface and an edge of the adjacent portion surrounding the antenna end surface are consistent with each other in each of the plurality of antennas such that a step is not substantially formed.

A manufacturing method according to another aspect of the present disclosure is to manufacture a metasurface structural body as an optical element having a plurality of two-dimensionally arranged fine structures so as to function as the optical element. The manufacturing method includes at least a layer forming step, an opening step, an etching step, a deposition step, and a removal step. In the layer forming step, a substrate having an upper surface and a lower surface opposing each other is prepared, and a mask layer is formed on the upper surface of the substrate. In the opening step, a plurality of opening portions are formed in the mask layer on the substrate. In the etching step, a plurality of recesses are formed in the substrate by etching the substrate through the plurality of opening portions. In the deposition step, an antenna material having a refractive index different from a refractive index of the substrate is deposited on the substrate through the plurality of opening portions. In the removal step, the mask layer is removed. In particular, in the deposition step, the antenna material is deposited on the substrate through the plurality of opening portions such that a flat surface is formed by both a region of the upper surface of the substrate covered by the mask layer and an upper surface of the antenna material exposed by the plurality of opening portions.

Advantageous Effects of Invention

According to various aspects of the present disclosure, it is possible to provide a metasurface structural body and a method for producing a metasurface structural body that can achieve desired optical characteristics.

DESCRIPTION OF EMBODIMENTS

Figure 1:
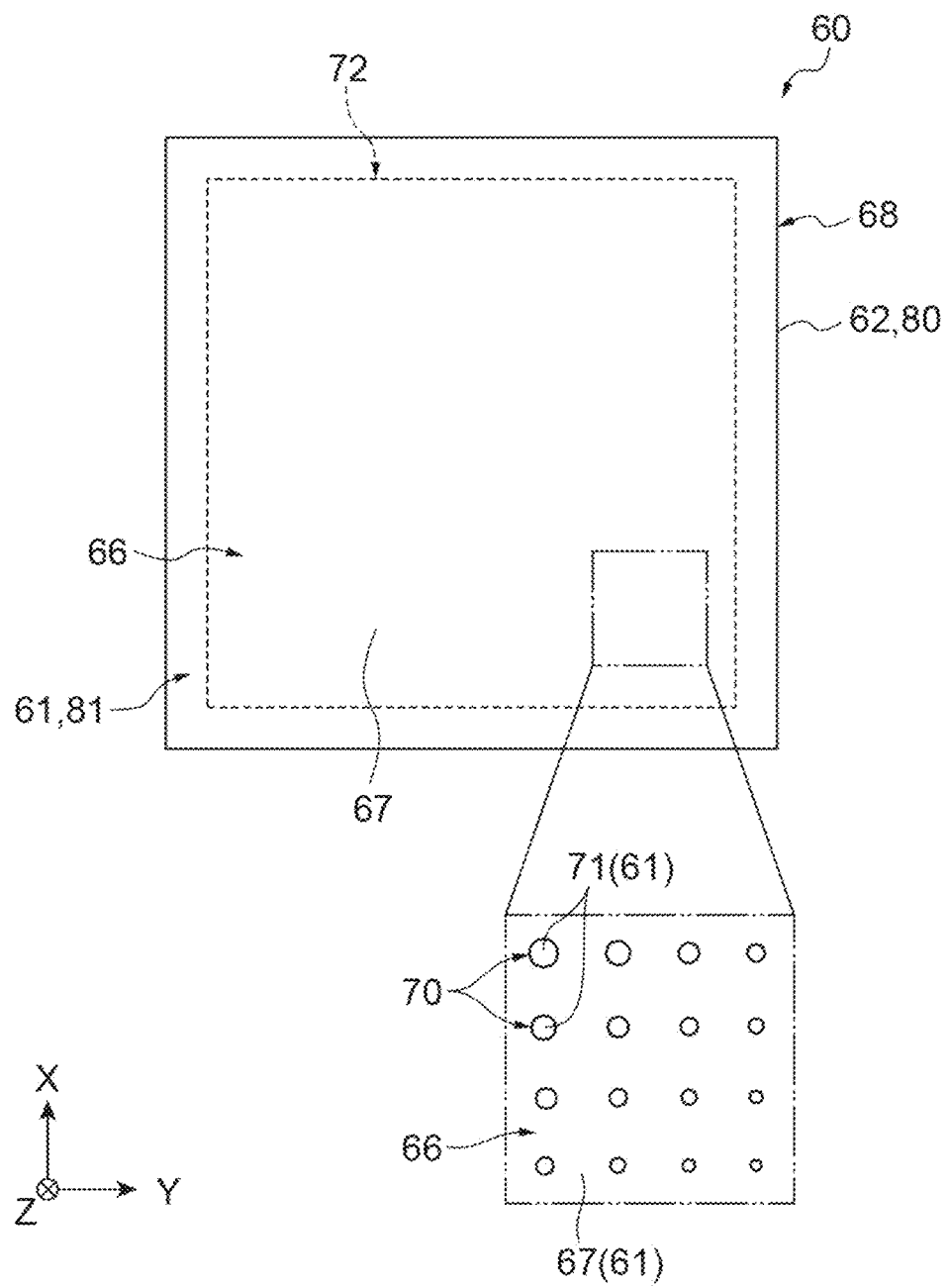
FIG. 1 is a plan view illustrating a metasurface structural body according to the present embodiment.

[Description of Embodiments of the Present Invention]
First, contents of embodiments of the present disclosure will be individually listed and described.
(1) A metasurface structural body according to an aspect of the present disclosure is an optical element that has a first surface and a second surface opposing each other and has a plurality of fine structures arranged along the first surface. The metasurface structural body includes a base member and a plurality of antennas. The base member is provided between the first surface and the second surface. The base member has a base portion and an adjacent portion provided between the first surface and the base portion. The plurality of antennas are provided as the plurality of fine structures between the first surface and the base portion. Each of the plurality of antennas has a first refractive index and an antenna end surface constituting a part of the first surface. The adjacent portion is provided between the first surface and the base portion such that a part of the adjacent portion is positioned between the plurality of antennas. The adjacent portion has a second refractive index different from the first refractive index, and constitutes a remaining part of the first surface. In the metasurface structural body, the plurality of antenna end surfaces and the adjacent-portion end surface constitute a flat surface as the first surface. Note that, the "flat surface" means a surface in which an edge of the antenna end surface and an edge of the adjacent portion surrounding the antenna end surface are consistent with each other in each of the plurality of antennas such that a step is not substantially formed.

According to the metasurface structural body, since the flat surface is constituted by both the plurality of antenna end surfaces and the adjacent-portion end surface, the traveling of the transmitted light in irregular directions due to scattering is suppressed. In the metasurface structural body, the material of the same type as the base member may not be provided on the plurality of antenna end surfaces. Thus, a degree of freedom in selecting the material for the front surface of the metasurface structural body is high. As a result, the metasurface structural body can achieve the desired optical characteristics.

(2) As the aspect of the present disclosure, the metasurface structural body may further include a covering layer. The covering layer has a third refractive index different from the first refractive index and the second refractive index. The covering layer is provided on a side opposite to the base portion with respect to the adjacent portion so as to cover the first surface. For example, the covering layer is comprised of a material having a higher strength than the antenna end surface and the adjacent-portion end surface, and thus, the covering layer can function as a protective layer for the first surface (flat surface). The covering layer is comprised of a material having a refractive index suitable for an intended use, and thus, interfacial reflection on the first surface is effectively suppressed (transmittance of transmitted light is improved). As a result, in the metasurface structural body, the functionality of the metasurface structural body is improved by appropriately selecting the material constituting the covering layer.

(3) As the aspect (metasurface structural body) of the present disclosure, it is preferable that plurality of antennas are arranged such that the antenna end surfaces of the plurality of antennas form a two-dimensional matrix on the first surface. In this case, the metasurface structural body can achieve, for example, an example of the optical element (can achieve the desired optical characteristics).

(4) As the aspect (metasurface structural body) of the present disclosure, an effective refractive index distribution of an antenna portion constituted by the plurality of antennas and the adjacent portion is adjusted in order to achieve a desired lens function. Specifically, the antenna portion is formed such that a one-dimensional arrangement formed by the antenna end surfaces of which centers of gravity are positioned on at least one reference line on the first surface includes an arrangement pattern in which at least one of a size of the antenna end surface (for example, is defined by an area, a maximum diameter, and the like of the antenna end surface), a shape of the antenna end surface, and the arrangement pitch for the plurality of antennas is changed along the reference line. That is, at least one of the size of the end surface, the shape of the end surface, and the arrangement pitch for the plurality of antennas is changed within the first surface when the first surface is viewed from a direction orthogonal to the first surface. As described above, the metasurface structural body can control the effective refractive index of each part of the antenna portion by controlling at least one of the size, the shape, and the arrangement pitch (arrangement) of the antenna. As described above, the metasurface structural body can set the lens to be thinner than the hemispherical lens of the related art by adjusting the effective refractive index of each part in the antenna portion.

Note that, the effective refractive index distribution of the antenna portion may be two-dimensionally adjusted. For example, when a plurality of reference lines intersecting with each other as the reference lines are set on the first surface, the structure and/or the arrangement pitch of the antennas are adjusted such that at least one of the size of the antenna end surface (is defined by the area of the antenna end surface), the shape of the antenna end surface, and the arrangement pitch is changed along each of the plurality of reference lines. In the present specification, the "arrangement pitch" is a distance defined on a plane on which the antenna end surfaces of the plurality of antennas are positioned, and is given as a distance between the centers of gravity between the antenna end surfaces of which the centers of gravity are positioned on one reference line and which are adjacent to each other.

(5) As the aspect (metasurface structural body) of the present disclosure, it is preferable that light having a wavelength in a range of 300 nm or more and 2000 nm or less is inputted to the first surface. It is preferable that the plurality of antennas are arranged such that the arrangement pitch is shorter than the wavelength of the input light. In this case, since the plurality of antennas are arranged at a pitch shorter than the wavelength of the input light, the input light behaves as if the metasurface structural body is a continuous medium. As a result, the metasurface structural body can achieve, for example, an example of the optical element (can achieve the desired optical characteristics).

(6) A manufacturing method according to another aspect of the present disclosure is to manufacture a metasurface structural body that functions as an optical element and has a plurality of two-dimensionally arranged fine structures. The manufacturing method includes at least a layer forming step, an opening step, an etching step, a deposition step, and a removal step. In the layer forming step, a substrate having an upper surface and a lower surface opposing each other is prepared, and a mask layer is formed on the upper surface of the substrate. In the opening step, a plurality of opening portions are formed in the mask layer on the substrate. In the etching step, a plurality of recesses are formed in the substrate by etching the substrate through the plurality of opening portions. In the deposition step, an antenna material having a refractive index different from a refractive index of the substrate is deposited on the substrate through the plurality of opening portions. In the removal step, the mask layer is removed. In particular, in the deposition step, the antenna material is deposited on the substrate through the plurality of opening portions such that a flat surface is formed by both a region of the upper surface of the substrate covered by the mask layer and an upper surface of the antenna material exposed by the plurality of opening portions.

Here, for example, as disclosed in Non Patent Literature 1, in the structural body in which the antenna material is buried by depositing the material of the same type as the substrate on the substrate and on the antenna material, it is considered that the flat surface is formed by polishing the material of the same type as the substrate until an end surface of the antenna material is exposed by a method such as chemical mechanical polishing (CMP). However, in this method, since the end surface of the antenna material is deeply polished in a recess surface shape with respect to the end surface of the substrate (that is, since dishing occurs), the front surface of the structural body constitutes an uneven surface. Accordingly, it is difficult to achieve the desired optical characteristics by this method.

In contrast, according to the manufacturing method of the present embodiment, the flat surface can be formed without using the method such as chemical mechanical polishing. Since the flat surface is formed by both the end surfaces of the plurality of antennas and the adjacent-portion end surface, the traveling of the transmitted light in irregular directions due to scattering is suppressed. In the manufacturing method, since the material of the same type as the substrate may not be provided on the plurality of antenna end surfaces, the degree of freedom in selecting the material on the front surface of the metasurface structural body is high. As a result, the manufacturing method achieves the desired optical characteristics.

(7) As the aspect (manufacturing method) of the present disclosure, the manufacturing method may further include a covering step as a step executed after the removal step. In the covering step, a covering material having a refractive index different from both the refractive index of the substrate and the refractive index of the antenna material is provided so as to cover the flat surface. For example, the covering layer is comprised of a material having a higher strength than the antenna end surface and the adjacent-portion end surface, and thus, the covering layer can function as the protective layer for the flat surface. The covering layer is comprised of a material having a refractive index suitable for the intended use, and thus, interfacial reflection on the flat surface is effectively suppressed (transmittance of transmitted light is improved). As a result, in the manufacturing method, the functionality of the metasurface structural body is improved by appropriately selecting the material constituting the covering layer.

(8) As the aspect (manufacturing method) of the present disclosure, in the opening step, it is preferable that the plurality of opening portions are formed in the mask layer such that the plurality of recesses are formed on the upper surface of the substrate in a two-dimensional matrix shape. In this case, the manufacturing method can achieve, for example, an example of the optical element (can achieve the desired optical characteristics).

(9) As the aspect (manufacturing method) of the present disclosure, in the opening step, the plurality of opening portions are formed in the mask layer such that a one-dimensional arrangement formed by openings of which centers of gravity are positioned on at least one reference line on the upper surface (region surrounded by opening ends of the recesses on the upper surface of the substrate) among the openings of the plurality of recesses includes an arrangement pattern in which at least one of a size of the recess opening, a shape of the recess opening, and an arrangement pitch is changed along the reference line. As a result, in the etching step, the plurality of recesses are formed on the upper surface of the substrate such that a one-dimensional arrangement formed by openings of which centers of gravity are positioned on at least one reference line on the upper surface among the openings of the plurality of recesses includes an arrangement pattern in which at least one of a size of the recess opening (defined by an area of the recess opening), a shape of the recess opening, and an arrangement pitch is changed along the reference line. That is, at least one of the size of the end surface, the shape of the end surface, and the arrangement pitch for the plurality of first antennas is changed within the upper surface when the upper surface is viewed from a direction orthogonal to the upper surface of the substrate. In this case, the metasurface structural body can control the effective refractive index of the antenna portion (a portion constituted by the plurality of recesses on which the antenna material is deposited and a part of the substrate on which the plurality of recesses are provided) by controlling at least one of the size of the opening, the shape of the opening, and the arrangement pitch (arrangement) of the recesses serving as the antennas. Accordingly, the manufacturing method can set the lens to be thinner than the hemispherical lens of the related art by adjusting the effective refractive indices of the antenna portion. Note that, the effective refractive index distribution of the antenna portion may be two-dimensionally adjusted by setting a plurality of reference lines as the reference line on the upper surface of the substrate and changing at least one of the size of the recess opening, the shape of the recess opening, and the arrangement pitch along each reference line.

(10) As the aspect (manufacturing method) of the present disclosure, it is preferable that light having a wavelength in a range of 300 nm or more and 2000 nm or less is inputted to the flat surface. In the opening step, the plurality of opening portions are formed in the mask layer such that the plurality of recesses are arranged at the arrangement pitch shorter than the wavelength of the input light. As a result, the plurality of recesses provided in the substrate in the etching step are arranged on the upper surface of the substrate at a pitch shorter than the wavelength of the input light. In this case, since the plurality of antennas are arranged at a pitch shorter than the wavelength of the input light, the input light behaves as if the metasurface structural body is a continuous medium. Accordingly, the manufacturing method can achieve, for example, an example of the optical element (can achieve the desired optical characteristics).

As described above, each of the aspects listed in the [Description of Embodiments of the Present Invention] is applicable to each of all the remaining aspects or all combinations of these remaining aspects.

[Details of Embodiment of Present Disclosure]

Hereinafter, specific structures of a metasurface structural body of the present disclosure and a method for manufacturing a metasurface structural body will be described in detail with reference to the accompanying drawings. Note that, the present invention is not limited to these examples, but is defined by the scope of the claims. The present invention is intended to include meanings equivalent to the scope of the claims and all modification examples within the scope. Further, in a description of the drawings, the same components are denoted by the same reference numerals, and a redundant description will be omitted.

(Configuration of Metasurface Structural Body)

Figure 2:
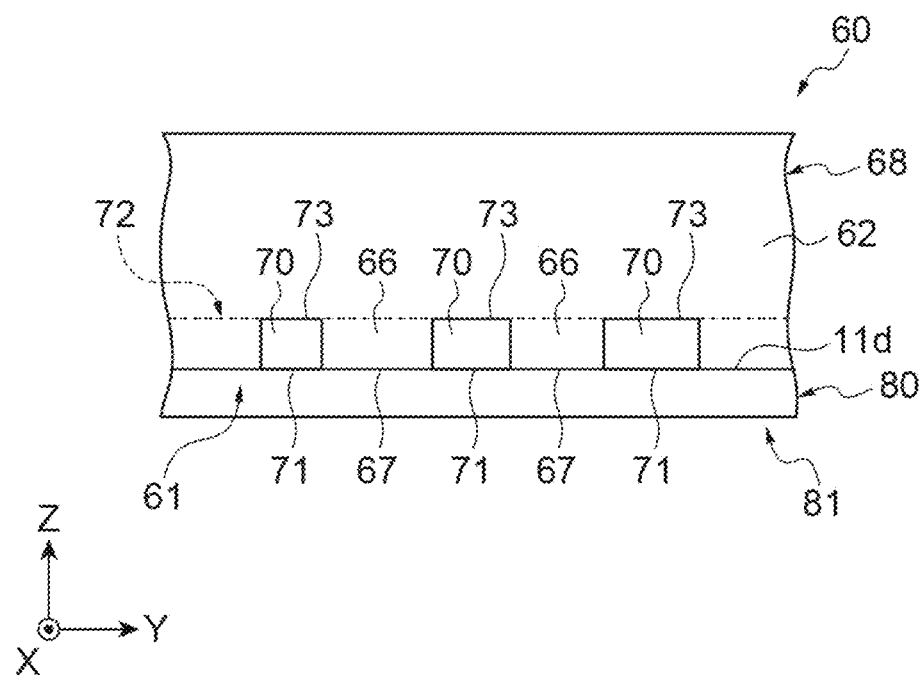
FIG. 2 is a front view schematically illustrating a part of the metasurface structural body of FIG. 1.

FIG. 1 is a plan view illustrating a metasurface structural body 60 according to the present embodiment. FIG. 2 is a front view schematically illustrating a part of the metasurface structural body 60 of FIG. 1. The metasurface structural body 60 illustrated in FIGS. 1 and 2 is a structural body having a metasurface structure. The "metasurface structure" is a structure in which a structural body functions as an optical element by providing a plurality of fine structures arranged on the structural body. For example, as the metasurface structure, the following six typical methods (hereinafter, referred to as "first method to sixth method") are illustrated.

The first method of the metasurface structure is a so-called multi-resonance method, and is described in detail in Non Patent Literature 2. The first method includes, for example, a plasmonic antenna, and has two types of resonance modes of a symmetric mode and an asymmetric mode which are characterized by a current flowing through the plasmonic antenna.

The second method of the metasurface structure is a so-called GAP-plasmon method, and is described in detail in Non Patent Literature 3. The second method is, for example, a reflection-type metasurface structure having a MIM structure as a basic configuration, and modulates a phase of light by a gap surface plasmonic mode. The gap surface plasmonic mode is a mode in which strong magnetic resonance occurs within a dielectric body depending on the fact that induced currents of an upper antenna and a lower antenna face in opposite directions. Accordingly, a reflection phase can be efficiently modulated by changing a length of the antenna.

The third method of the metasurface structure is a so-called Pancharatnam-Berry phase (PB phase) method, and is described in detail in Non Patent Literature 4 described above. The third method modulates the phase by, for example, modulating the angles of antennas of the same shape.

The fourth method of the metasurface structure is the so-called Huygens-metasurface method, and is described in detail in Non Patent Literature 5 and Non Patent Literature 6. In the fourth method, for example, the reflectance is reduced by simultaneously adjusting an electric dipole and a magnetic dipole at an interface of a medium having independent electromagnetic field characteristics.

The fifth method of the metasurface structure is a so-called high-contrast method, and is described in detail in Non Patent Literature 7. The fifth method realizes a plurality of modes of Fabry-Perot resonance having a low Q value by using, for example, a large difference in the refractive index between the antenna and the surrounding medium. The plurality of modes include the electric and magnetic dipoles.

The sixth method of the metasurface structure is a so-called gradient-index method, and is described in detail in Non Patent Literature 8. In the sixth method, for example, the phase (effective refractive index) is modulated by changing a filling rate in a unit cell of a media having different refractive indices.

The metasurface structural body 60 has a thin film shape or a flat plate shape. The metasurface structural body 60 includes a base member 68, a plurality of antennas 70, and a covering layer 80. In the metasurface structural body 60, a portion constituted by the base member 68 and the plurality of antennas 70 has a flat surface 61 as one surface (details will be described later). The covering layer 80 covers the flat surface 61, and has a covering surface 81 as a surface opposite to the flat surface 61. Note that, in the following description, a direction parallel to the flat surface 61 of the metasurface structural body 60 is an "XY-direction (direction parallel to an XY-plane)", and a direction orthogonal to the flat surface 61 of the metasurface structural body 60 is a "Z-direction".

The base member 68 is a member that serves as a base body of the metasurface structural body 60, and holds the plurality of antennas 70. The base member 68 has, for example, a thin film shape or a flat plate shape. A size of a base portion 62 viewed from the Z-direction is not particularly limited. A shape of the base member 68 viewed along the Z-direction is not particularly limited, and has a rectangular shape in the example of FIG. 1. The base member 68 may be comprised of quartz. In this case, the base member 68 has a refractive index of about 1.45.

The base member 68 has the base portion 62 and the adjacent portion 66 adjacent to the base portion 62. The base portion 62 and the adjacent portion 66 are integrally formed. The case where these portions are "integrally formed" means that these portions are formed as a single member.

The base portion 62 has, for example, a thin film shape or a flat plate shape. The base portion 62 may have, for example, a thickness of 100 nm or more and 3 mm or less. When the base member 68 is viewed along the Z-direction, the size and shape of the base portion 62 are consistent with the size and shape of the base member 68. A size of a base portion 62 viewed from the Z-direction is not particularly limited. The shape of the base portion 62 viewed from the Z-direction is not particularly limited, and has the same rectangular shape as the base member 68 in the example of FIG. 1. When the base member 68 including the base portion 62 is comprised of quartz, the base portion 62 has a refractive index of about 1.45. The plurality of antennas 70 are positioned on the base portion 62 on one side of the base portion 62 (details will be described later).

The adjacent portion 66 is a portion positioned between the plurality of antennas 70 on the base portion 62, and are integrally formed with the base portion 62. The case where the adjacent portion 66 is "positioned between the plurality of antennas 70" means that the adjacent portion 66 is positioned so as to bury spaces between the plurality of antennas 70 without gaps. That is, the plurality of antennas 70 are buried in the adjacent portion 66. Note that, the adjacent portion 66 may not be integrally formed with the base portion 62. In other words, the adjacent portion 66 and the base portion 62 may be formed by a combination of members separated from each other.

The adjacent portion 66 has a second refractive index different from a first refractive index of the antenna 70. When the base member 68 including the adjacent portion 66 is comprised of quartz, the second refractive index is about 1.45. Note that, when the metasurface structural body 60 constitutes, as an optical element, a part of an optical system and the flat surface 61 of the metasurface structural body 60 abuts on another member (for example, an observation object or a light receiver), the second refractive index may be set to a value such that a difference between the second refractive index and a refractive index of the other member is smaller than a difference between a refractive index of air and the refractive index of the other member. The difference in refractive index between the metasurface structural body 60 and the other member is small, and thus, interfacial reflection (Fresnel reflection) on the other member is suppressed.

The adjacent portion 66 includes an adjacent-portion end surface 67 that is an end surface on a lower side (opposite to the base portion 62). The adjacent-portion end surface 67 is formed by a surface excluding a portion at which an antenna end surface 71 which is an end surface on a lower side (opposite to the base portion 62) of the antenna 70 positioned when the flat surface 61 is viewed along the Z-direction. The adjacent-portion end surface 67 forms a part of the flat surface 61.

Each antenna 70 is a fine structure in the metasurface structure. Each antenna 70 is a member that is arranged below the base portion 62 and adjusts an effective refractive index in the vicinity of the flat surface 61 of the metasurface structural body 60. As described above, each antenna 70 is arranged on the base portion 62 on one side of the base portion 62, and has the antenna end surface 71 opposite to the base portion 62. In the present embodiment, each antenna 70 has a pillar shape of which an axis extends along the Z-direction, and more specifically, has a columnar shape. Note that, the shape of each antenna 70 is not necessarily limited to the columnar shape and is not limited to a cylindrical shape as long as the effective refractive index of the metasurface structural body 60 can be controlled. The effective refractive index will be described later.

Each antenna 70 has the first refractive index different from the second refractive index. Each antenna 70 is comprised of, for example, silicon. In this case, the first refractive index is about 3.5.

Each antenna 70 is arranged such that the antenna end surface 71 is exposed on the flat surface 61. That is, the adjacent-portion end surface 67 forms a part of the flat surface 61, whereas each antenna end surface 71 forms a remaining part of the flat surface 61. The plurality of antenna end surfaces 71 and the adjacent-portion end surface 67 are flush with each other. That is, the plurality of antenna end surfaces 71 and the adjacent-portion end surface 67 form the flat surface 61 which is a substantially continuous flat surface. Note that, the "flat" may mean a state in which there is substantially no step, for example, a state in which a height difference is within 20 nm in a direction perpendicular to the surface (that is, each portion of the flat surface 61 is included in a range of −10 nm or more and +10 nm or less with respect to a virtual reference surface). Note that, in this case, whether or not the flat surface 61 is flat may be determined at a portion excluding minute irregularities and burrs that occur in manufacturing so as not to significantly affect the optical characteristics of the metasurface structural body 60.

The antennas 70 are two-dimensionally arranged when the flat surface 61 is viewed along the Z-direction. In particular, in the present embodiment, the antennas 70 are arranged in a lattice shape, that is, a matrix shape when the flat surface 61 is viewed along the Z-direction. An arrangement pitch of the antennas 70 may be decided as follows. That is, when light having a predetermined wavelength is inputted to the metasurface structural body 60, the antennas 70 may be arranged at a predetermined pitch shorter than the wavelength of the light inputted to the metasurface structural body 60 when the flat surface 61 is viewed along the Z-direction. Note that, for example, the "predetermined wavelength" may be a wavelength of 100 nm or more and 5200 nm or less, or may be a wavelength of 300 nm or more and 2000 nm or less. The "predetermined pitch" may be the same in the entire region in which the plurality of antennas 70 are arranged, may be different for each portion of the region in which the plurality of antennas 70 are arranged, and may be gradually changed along the region in which the plurality of antennas 70 are arranged. For example, the "predetermined pitch" may be 20% or more and 100% or less of the predetermined wavelength, and specifically, may be 100 nm or more and 5200 nm or less. In this case, the plurality of antennas 70 can suitably refract the light.

In the metasurface structural body 60, when the flat surface 61 is viewed along the Z-direction, at least one of a size, a shape, and an arrangement pitch of the plurality of antennas 70 may be changed within the flat surface 61. Here, the case where the at least one is "changed within the flat surface 61" means that the at least one can be different depending on a position on the flat surface 61. Accordingly, the antenna 70 can adjust the effective refractive index in the vicinity of the flat surface 61 of the metasurface structural body 60 (details will be described later).

In the metasurface structural body 60, an antenna portion 72 which is a portion at which the plurality of antennas 70 are arranged forms a metasurface structure. The "antenna portion 72" is specifically a portion of the metasurface structural body 60 that is constituted by the plurality of antennas 70 and the adjacent portion 66. More specifically, in the metasurface structural body 60, when the antenna portion 72 is a portion specified by a range from a position of the antenna end surface 71 of the antenna 70 to a position of the end surface 73 opposite to the antenna end surface 71 of the antenna 70 in the Z-direction and is a portion (a broken line portion in the drawing) specified by a range including the plurality of antennas 70 in the XY-direction (on a surface parallel to the XY-plane).

Figure 3:
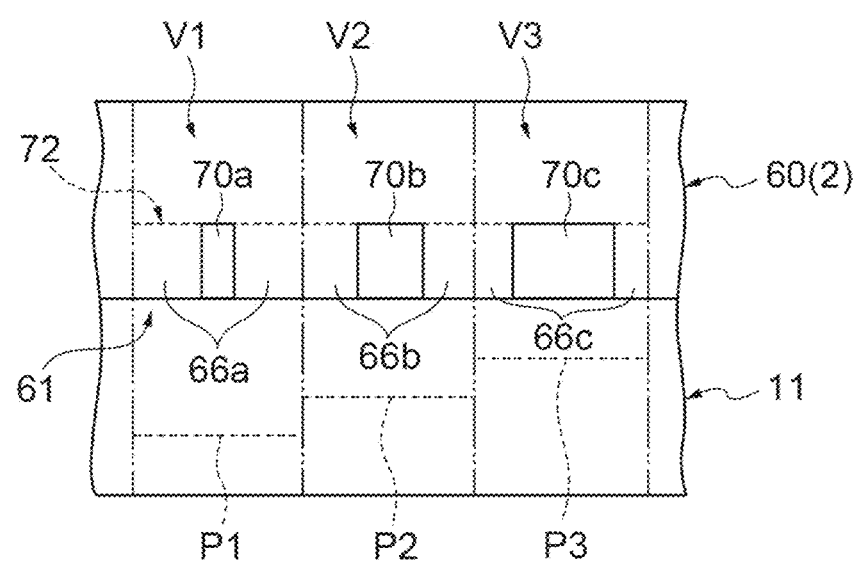
FIG. 3 is a diagram for describing an effective refractive index distribution in the metasurface structural body.
Figure 4:
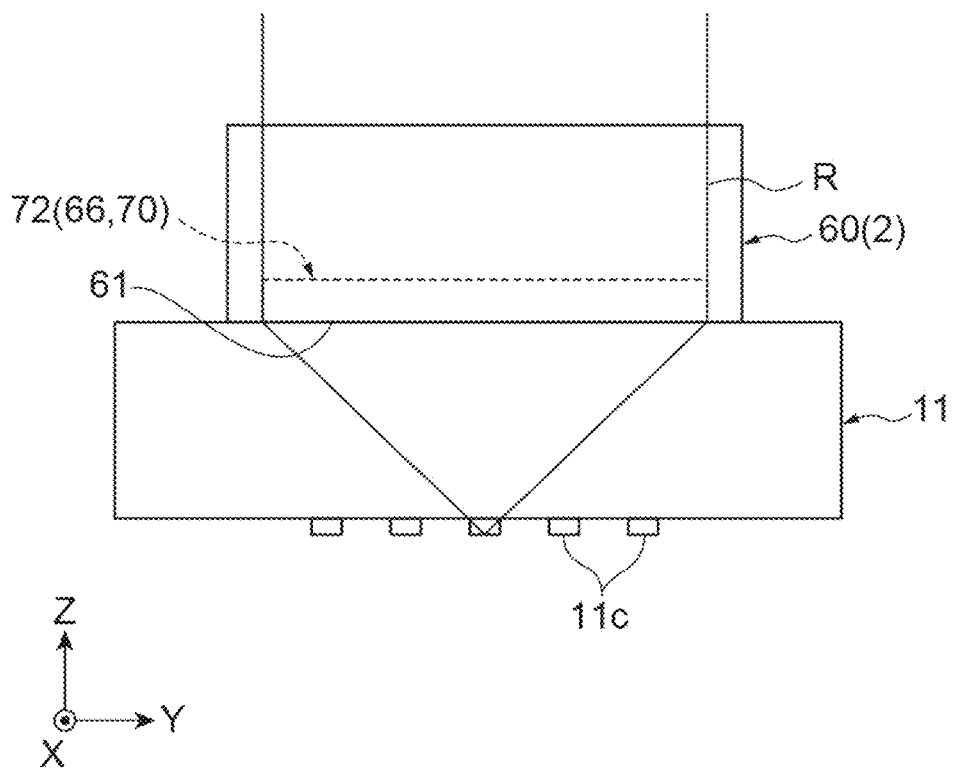
FIG. 4 is a diagram for describing a path of light transmitted through the metasurface structural body.

Here, the metasurface structural body 60 functioning as a lens will be described with reference to FIGS. 3 and 4. FIG. 3 is a diagram for describing that the effective refractive indices in the metasurface structural body 60 have a distribution. FIG. 4 is a diagram for describing a path of light transmitted through the metasurface structural body 60. The case where the effective refractive indices "have the distribution" means that the effective refractive indices can have different states or values depending on the position thereof. Note that, in FIGS. 3 and 4, the covering layer 80 is omitted. In FIGS. 3 and 4, a semiconductor device 11 in which an integrated circuit 11*c* is formed on a front surface is exemplified as the observation object, and the flat surface 61 of the metasurface structural body 60 abuts on a back surface of the semiconductor device 11. The metasurface structural body 60 has the following effective refractive indices $n_{eff}$ in the antenna portion 72. That is, when a filling rate, a first refractive index, and a second refractive index of the antenna 70 in a unit volume of the antenna portion 72 are a, $n_{ms}$, and $n_b$, respectively, the effective refractive index $n_{eff}$ is expressed by the following Formula (1).

$$n_{eff} = \sqrt{a n_{ms}^2 + (1-a) n_b^2} \quad (1)$$

As described above, when the flat surface 61 is viewed along the Z-direction, at least one of the size, the shape, and the arrangement pitch of the antenna 70 is changed within the flat surface 61. For example, FIG. 3 illustrates an example in which the size of the antenna 70 is changed within the flat surface 61. In FIG. 3, the metasurface structural body 60 is divided into unit volume portions V1, V2, and V3. In FIG. 3, when light having the same phase is inputted to each of the portions V1, V2, and V3 from an upper side of the metasurface structural body 60, positions P1, P2, and P3 having the same phase in transmitted light transmitted to the lower side of the metasurface structural body 60 are illustrated.

The size of the antenna 70 (an area of the antenna end surface 71 which is a cross-sectional area of the antenna 70 when the flat surface 61 is viewed along the Z-direction) is different from each other in each of the portions V1, V2, and V3. Here, an antenna 70*a* and adjacent portion 66*a* are present in the portion V1. An antenna 70*b* and adjacent portion 66*b* are present in the portion V2. An antenna 70*c* and adjacent portion 66*c* are present in the portion V3. The antenna 70*a*, the antenna 70*b*, and the antenna 70*c* become larger in this order. That is, the filling rates a of the antennas 70 become higher in this order in the portion V1, the portion V2, and the portion V3.

Accordingly, the effective refractive indices $n_{eff}$ of the portions V1, V2, and V3 calculated by the above Formula (1) become larger in the order of the portion V1, the portion V2, and the portion V3, and the effective refractive indices $n_{eff}$ of the antenna portion 72 have the distribution. Distances of the position P1, the position P2, and the position P3 having the same phase in the transmitted light transmitted to the lower side of the metasurface structural body 60 from the flat surface 61 become shorter in this order. As a result of the generation of a phase difference in the transmitted light as described above, light R is refracted by the metasurface structural body 60 as illustrated in FIG. 4, and the metasurface structural body 60 functions as the lens by adjusting the effective refractive indices $n_{eff}$ of the antenna portion 72. In particular, for example, the metasurface structural body 60 more suitably functions as the lens by concentrically changing the effective refractive indices $n_{eff}$ of the antenna portion 72. Note that, the plurality of antennas 70 are arranged at the pitch shorter than the wavelength of the input light, and thus, the input light behaves as if the antenna portion 72 is the continuous medium having the effective refractive indices $n_{eff}$.

Referring back to FIGS. 1 and 2, the covering layer 80 has a third refractive index different from the first refractive index and the second refractive index, and covers the flat surface 61. The covering layer 80 has a flat covering surface 81 as a surface opposite to the flat surface 61. The covering layer 80 improves various kinds of functionality of the flat surface 61. For example, the covering layer 80 can function as a protective layer for the flat surface 61 by being comprised of a material having a higher strength than the antenna end surface 71 and the adjacent-portion end surface 67. Alternatively, the covering layer 80 can suppress interfacial reflection on the flat surface 61 and improve the transmittance of the transmitted light by selecting, as the material of the covering layer 80, a material having a refractive index suitable for an intended use. The material of the covering layer 80 may be, for example, silicon dioxide ($SiO_2$), silicon nitride ($Si_3N_4$), or the like. A thickness of the covering layer 80 can be, for example, 30 nm or more and 300 nm or less. The thickness is set within this range, and thus, the covering layer 80 has a strength sufficient to function as the protective layer for the flat surface 61, and can suppress a decrease in transmittance of the light.

(First Manufacturing Method of Metasurface Structural Body)

A first manufacturing method of the metasurface structural body 60 will be described with reference to FIGS. 5A to 5C and FIGS. 6A to 6C. FIGS. 5A to 5C and FIGS. 6A to 6C are diagrams for describing the first manufacturing method of the metasurface structural body 60.

Figure 5A:
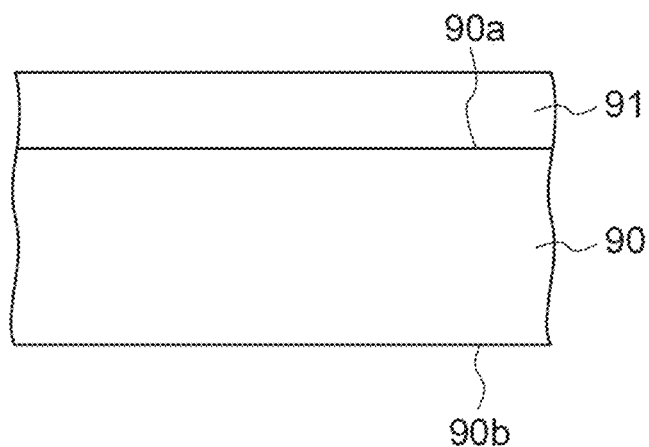
FIGS. 5A to 5C are diagrams for describing a first manufacturing method of the metasurface structural body (first).

First, as illustrated in FIG. 5A, a substrate 90 comprised of a second material having a second refractive index is prepared. Examples of the second material include quartz. The substrate 90 may have a thin film shape or a flat plate shape. The substrate 90 serves as the base portion 62 and the adjacent portion 66 of the metasurface structural body 60.

Subsequently, a mask layer 91 as a resist is formed on the substrate 90 (layer forming step). The mask layer 91 is formed on an upper surface 90*a* of the substrate 90 by, for example, electron beam resist coating. Examples of a material of the mask layer 91 include an electron beam resist such as ZEP520A. The mask layer 91 can have a thickness of, for example, about 300 nm.

Figure 5B:
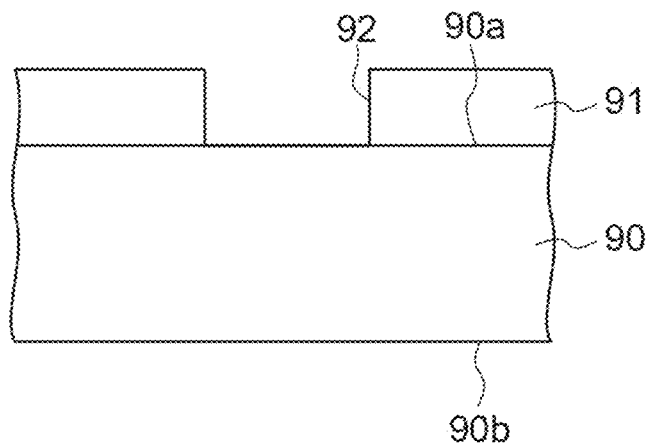

Subsequently, as illustrated in FIG. 5B, a plurality of opening portions 92 are formed in the mask layer 91 formed on the substrate 90 (opening step). The opening portion 92 may be formed by performing electron beam drawing and development on the mask layer 91.

The opening portions 92 may be formed so as to be arranged in a lattice shape when the upper surface 90a is viewed from a direction orthogonal to the upper surface 90a of the substrate 90. More specifically, when the light having the predetermined wavelength is inputted to the metasurface structural body 60 to be manufactured, the opening portions 92 may be formed so as to be arranged at a pitch shorter than the predetermined wavelength when the upper surface 90a is viewed along the direction orthogonal to the upper surface 90a of the substrate 90. Here, a size, a shape, and an arrangement pitch of the opening portions 92 to be formed become the size, the shape, and the arrangement pitch of the antennas 70. The opening portion 92 may have, for example, a circular shape having a diameter of 50 nm or more and 270 nm or less. The opening portions 92 may be formed so as to be arranged at a pitch of 300 nm, for example. When the upper surface 90a is viewed along the direction orthogonal to the upper surface 90a of the substrate 90, at least one of the size, the shape, and the arrangement pitch of the plurality of opening portions 92 is changed within the upper surface 90a of the substrate 90. Here, the case where the at least is "changed within the upper surface 92a of the substrate 90" means that the at least may be different depending on the position on the upper surface 90a of the substrate 90.

Figure 5C:
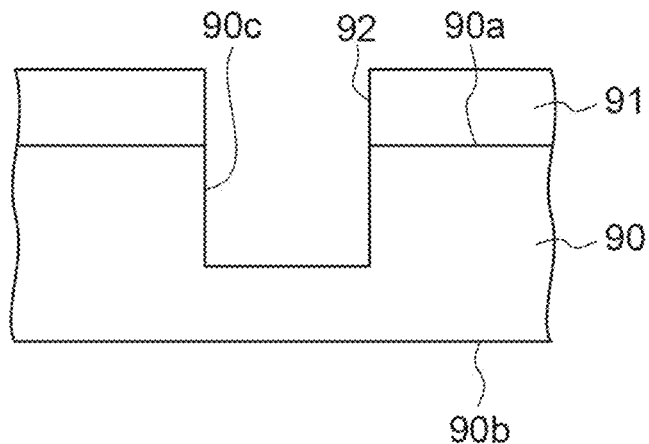

Subsequently, as illustrated in FIG. 5C, etching is performed through the plurality of opening portions 92, and a plurality of recesses 90c are formed in the substrate 90 (etching step). As the etching, for example, dry etching may be performed, and particularly, reactive ion etching (RIE) may be performed. The etching is performed from the upper surface 90a to the inside of the substrate 90 without penetrating from the upper surface 90a to a lower surface 90b (second surface) of the substrate 90. Accordingly, a recess 90c having a predetermined depth (etching depth) is formed on the upper surface 90a of the substrate 90. The etching depth can be about 500 nm, for example.

Note that, when the opening portions 92 are formed so as to be arranged in the lattice shape in the opening step, the recesses 90c are formed so as to be arranged in a lattice shape when the upper surface 90a is viewed along the direction orthogonal to the upper surface 90a of the substrate 90 in the etching step. In particular, when the light having the predetermined wavelength is inputted to the metasurface structural body 60 to be manufactured, the opening portions 92 are formed so as to be arranged at a pitch shorter than the predetermined wavelength in the opening step. At this time, in the etching step, the recesses 90c are also formed so as to be arranged at a pitch shorter than the predetermined wavelength when the upper surface 90a is viewed along the direction orthogonal to the upper surface 90a of the substrate 90. When at least one of the size, the shape, and the arrangement pitch of the plurality of opening portions 92 in the opening step is changed within the upper surface 90a of the substrate 90, the recesses 90c are formed such that at least one of the size, the shape, and the arrangement pitch of the plurality of recesses 90c is changed in the upper surface 90a of the substrate 90 when the upper surface 90a is viewed along the direction orthogonal to the upper surface 90a of the substrate 90 in the etching step.

Figure 6A:
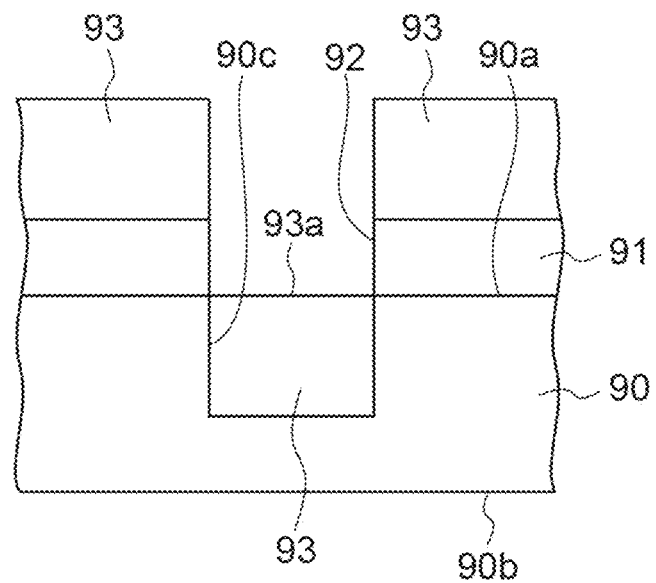
FIGS. 6A to 6C are diagrams for describing the first manufacturing method of the metasurface structural body (second).

Subsequently, as illustrated in FIG. 6A, an antenna material 93 comprised of a first material different from the second material is deposited on the substrate 90 through each opening portion 92 (deposition step). Here, the antenna material 93 deposited in the recess 90c of the substrate 90 becomes the antenna 70. At this time, the antenna material 93 is also deposited on the mask layer 91. The first material has a first refractive index different from the second refractive index. Examples of the method of depositing the antenna material 93 on the substrate 90 include pulse laser vapor deposition and resistance heating vapor deposition. When the pulsed laser deposition is performed, examples of the first material include silicon and germanium. Meanwhile, when the resistance heating vapor deposition is performed, examples of the first material include gold, silver, and chromium.

In the deposition step, the antenna material 93 is deposited such that the upper surface 90a of the substrate 90 and an upper surface 93a of the antenna material 93 form a flat surface (first surface) 61. That is, a thickness of the antenna material 93 deposited on the substrate 90 may be the same as a depth of the recess 90c formed on the upper surface 90a of the substrate 90 in the etching step. Accordingly, the upper surface 90a of the substrate 90 and the upper surface 93a of the antenna material 93 deposited on the substrate 90 are flush with each other. That is, the flat surface 61 is formed by the upper surface 90a of the substrate 90 and the upper surface 93a of the antenna material 93. The thickness of the antenna material 93 deposited on the substrate 90 can be, for example, about 500 nm. The thickness of the antenna material 93 deposited on the substrate 90 may be controlled, for example, by acquiring a relationship between a deposition time under a predetermined condition and the thickness of the deposited antenna material 93 in advance and adjusting the deposition time in the deposition step.

Figure 6B:
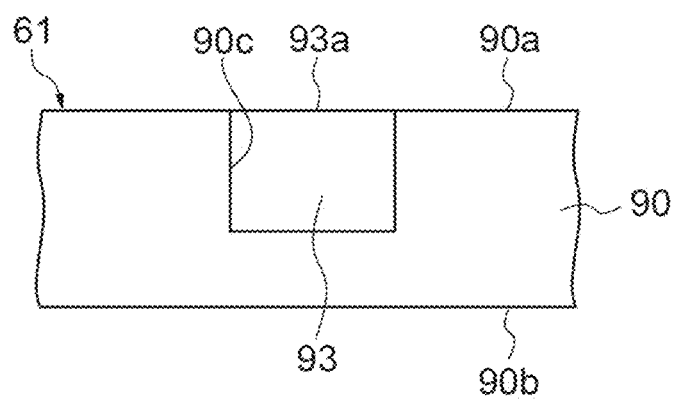

Subsequently, as illustrated in FIG. 6B, the mask layer 91 is removed (removal step). That is, the resist is lifted off. Accordingly, the antenna material 93 deposited on the mask layer 91 is removed together with the mask layer 91. As a result, the flat surface 61 formed by the upper surface 90a of the substrate 90 and the upper surface 93a of the antenna material 93 deposited on the substrate 90 is exposed.

Figure 6C:
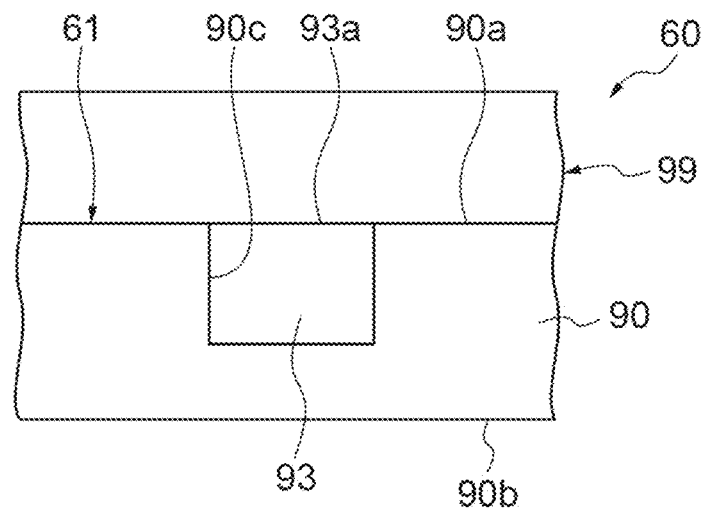

Subsequently, as illustrated in FIG. 6C, the flat surface 61 is covered by a covering material 99 having a third refractive index different from the first refractive index and different from the second refractive index (covering step). This covering material 99 becomes the covering layer 80 of the metasurface structural body 60. Through the above steps, the metasurface structural body 60 is manufactured.

(Second Manufacturing Method of Metasurface Structural Body)

A second manufacturing method of the metasurface structural body 60 will be described with reference to FIGS. 7A to 10B. FIGS. 7A to 10B are diagrams for describing the second manufacturing method of the metasurface structural body 60.

Figure 7A:
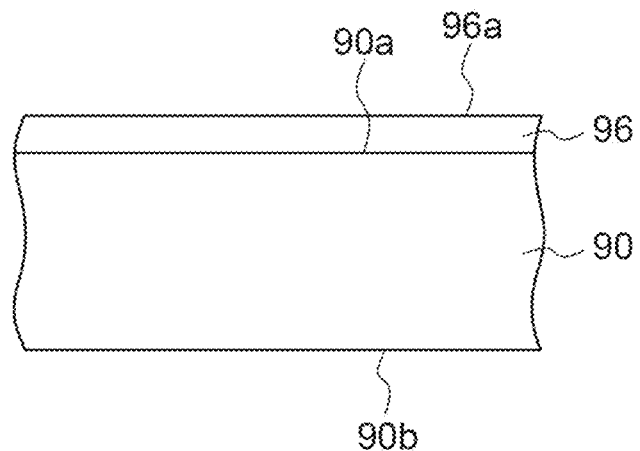
FIGS. 7A and 7B are diagrams for describing a second manufacturing method of the metasurface structural body (first).

First, as illustrated in FIG. 7A, the substrate 90 comprised of a second material having a second refractive index is prepared. The substrate 90 used in the second manufacturing method may be the same substrate as the substrate 90 used in the first manufacturing method.

Figure 7B:
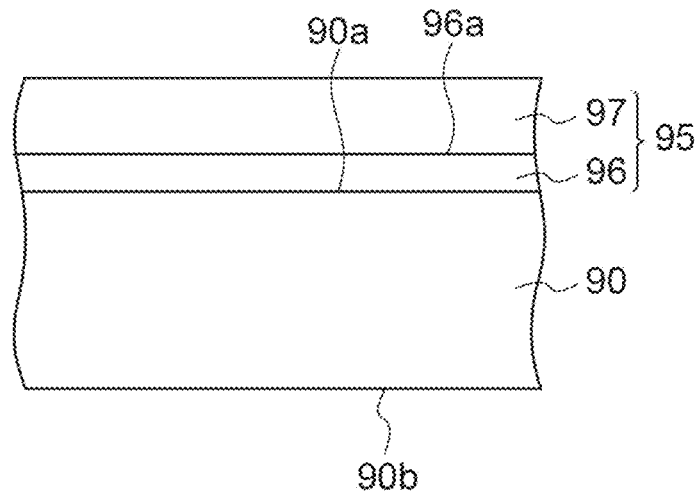

Subsequently, as illustrated in FIG. 7B, a mask layer 95 is formed on the substrate 90 (layer forming step). The mask layer 95 is formed by sequentially stacking a hard mask 96 and a resist 97. The hard mask 96 is formed on the upper surface 90a of the substrate 90 by, for example, resistance heating vapor deposition. Examples of a material of the hard mask 96 include chromium, nickel, and aluminum. The resist 97 is formed on an upper surface 96a of the hard mask 96 by, for example, electron beam resist coating. Examples of a material of the resist 97 include electron beam resist such as ZEP520A. A thickness of the resist 97 can be set to about 300 nm, for example.

Figure 8A:
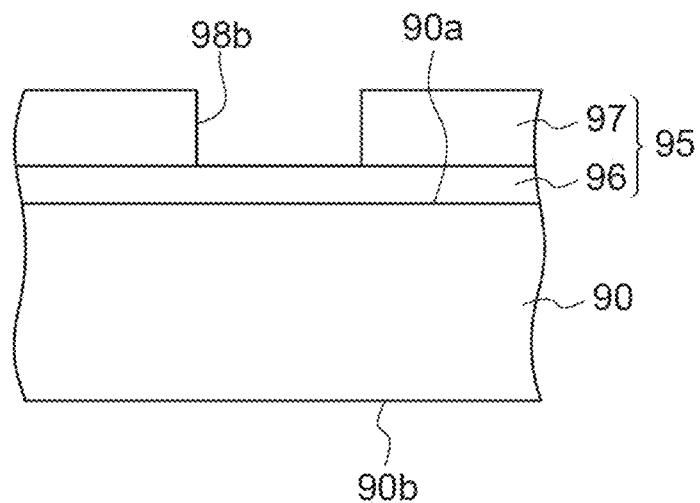
FIGS. 8A and 8B are diagrams for describing the second manufacturing method of the metasurface structural body (second).
Figure 8B:
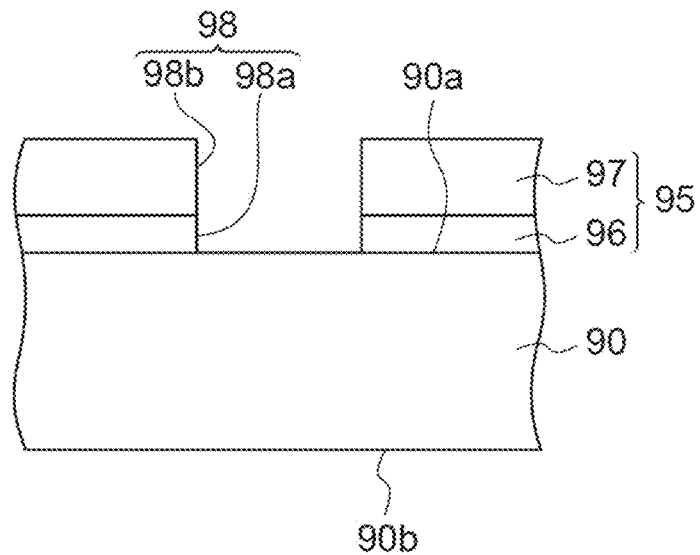

Subsequently, as illustrated in FIGS. 8A and 8B, a plurality of opening portions 98 are formed in the mask layer 95 formed on the substrate 90 (opening step). The opening portion 98 includes a hard-mask opening portion 98*a* formed in the hard mask 96 and a resist opening portion 98*b* formed in the resist 97. The hard-mask opening portion 98*a* is formed through the resist opening portion 98*b*. Thus, the hard-mask opening portion 98*a* and the resist opening portion 98*b* are formed at the same position when the upper surface 90*a* is viewed along the direction orthogonal to the upper surface 90*a* of the substrate 90. The resist opening portion 98*b* may be formed by performing electron beam drawing and development on the resist 97. The hard-mask opening portion 98*a* may be formed by performing induce coupled plasma-reactive ion etching (ICP-RIE) on the hard mask 96.

The opening portions 98 may be formed so as to be arranged similarly to the opening portions 92 in the first manufacturing method. That is, the opening portions 98 may be formed so as to be arranged in a lattice shape when the upper surface 90*a* is viewed along the direction orthogonal to the upper surface 90*a* of the substrate 90. More specifically, when the light having the predetermined wavelength is inputted to the metasurface structural body 60 to be manufactured, the opening portions 98 may be formed so as to be arranged at a pitch shorter than the predetermined wavelength when the upper surface 90*a* is viewed along the direction orthogonal to the upper surface 90*a* of the substrate 90. Here, a size, a shape, and an arrangement pitch of the opening portions 98 to be formed become the size, the shape, and the arrangement pitch of the antennas 70. An opening portion of the opening portion 98 may be, for example, a circular shape having a diameter of 80 nm or more and 260 nm or less. The opening portions 98 may be formed to be arranged at a pitch of 300 nm, for example. When the upper surface 90*a* is viewed along the direction orthogonal to the upper surface 90*a* of the substrate 90, at least one of the size, the shape, and the arrangement pitch of the plurality of opening portions 98 is changed within the upper surface 90*a* of the substrate 90.

Figure 9A:
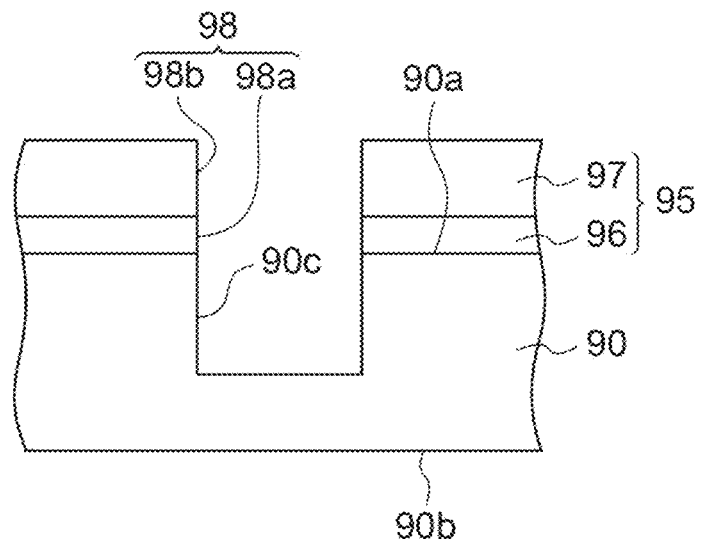
FIGS. 9A and 9B are diagrams for describing the second manufacturing method of the metasurface structural body (third).

Subsequently, as illustrated in FIG. 9A, etching is performed through the plurality of opening portions 98, and a plurality of recesses 90*c* are formed in the substrate 90 (etching step). The etching step may be performed similarly to the etching step in the first manufacturing method.

Note that, the recesses 90*c* may be formed so as to be arranged similarly to the recesses 90*c* in the first manufacturing method. That is, when the opening portions 98 are formed so as to be arranged in the lattice shape in the opening step, the recesses 90*c* are formed so as to be arranged in a lattice shape when the upper surface 90*a* is viewed along the direction orthogonal to the upper surface 90*a* of the substrate 90 in the etching step. In particular, when the light having the predetermined wavelength is inputted to the manufactured metasurface structural body 60, the opening portions 98 are formed so as to be arranged at a pitch shorter than the predetermined wavelength in the opening step. At this time, in the etching step, the recesses 90*c* are formed so as to be arranged at a pitch shorter than the predetermined wavelength when the upper surface 90*a* is viewed along the direction orthogonal to the upper surface 90*a* of the substrate 90. When at least one of the size, the shape, and the arrangement pitch of the plurality of opening portions 98 in the opening step is changed within the upper surface 90*a* of the substrate 90, the recesses 90*c* are formed such that at least one of the size, the shape, and the arrangement pitch of the plurality of recesses 90*c* is changed in the upper surface 90*a* of the substrate 90 when the upper surface 90*a* is viewed along the direction orthogonal to the upper surface 90*a* of the substrate 90 in the etching step.

Figure 9B:
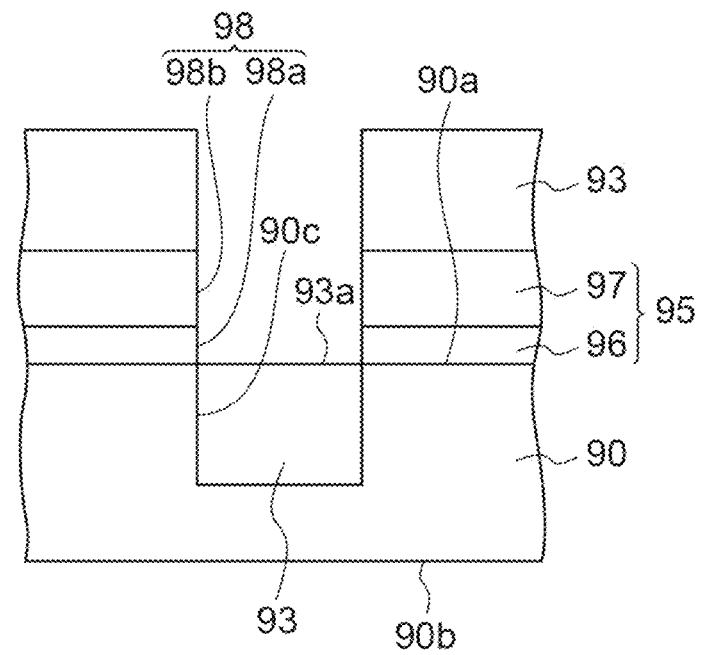

Subsequently, as illustrated in FIG. 9B, the antenna material 93 comprised of a first material different from the second material is deposited on the substrate 90 through each opening portion 98 (deposition step). The deposition step may be performed similarly to the deposition step in the first manufacturing method. The upper surface 90*a* of the substrate 90 and an upper surface 93*a* of the antenna material 93 deposited on the substrate 90 are flush with each other. That is, the flat surface 61 is formed by the upper surface 90*a* of the substrate 90 and the upper surface 93*a* of the antenna material 93.

Figure 10A:
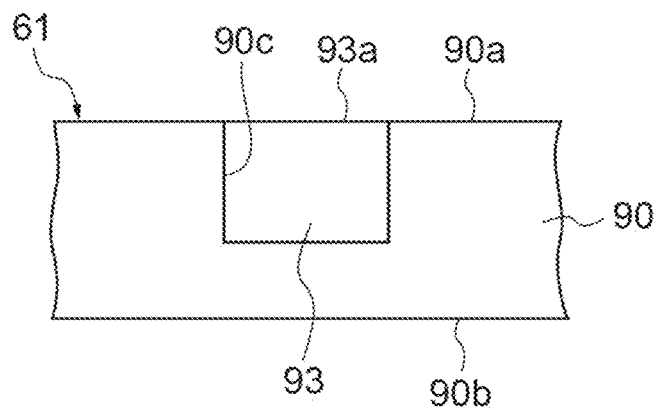
FIGS. 10A and 10B are diagrams for describing the second manufacturing method of the metasurface structural body.

Subsequently, as illustrated in FIG. 10A, the mask layer 95 is removed (removal step). That is, a hard mask 96 is lifted off. Accordingly, a resist 97 formed on the hard mask 96 and the antenna material 93 deposited on the resist 97 are removed together with the hard mask 96. As a result, the flat surface 61 formed by the upper surface 90*a* of the substrate 90 and the upper surface 93*a* of the antenna material 93 deposited on the substrate 90 is exposed.

Figure 10B:
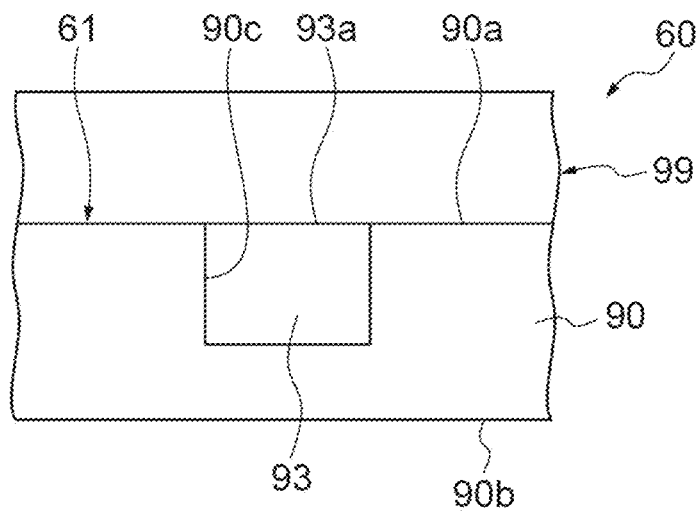

Subsequently, as illustrated in FIG. 10B, the flat surface 61 is covered by the covering material 99 (covering step). The covering step may be performed similarly to the deposition step in the first manufacturing method. This covering material 99 becomes the covering layer 80 of the metasurface structural body 60. Through the above steps, the metasurface structural body 60 is manufactured.

(First Application Example of Metasurface Structural Body)

Figure 11:
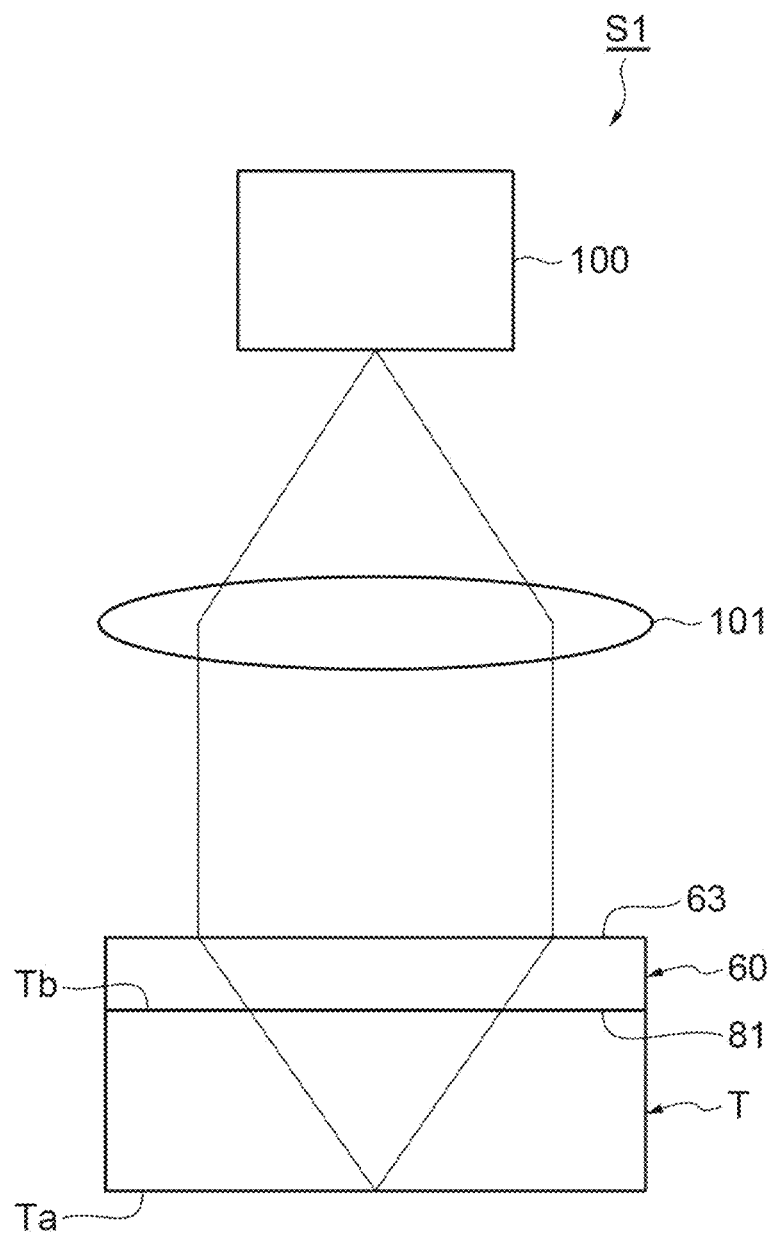
FIG. 11 is a diagram illustrating an irradiation optical system using the metasurface structural body.

A first application example of the metasurface structural body 60 to an irradiation optical system S1 will be described with reference to FIG. 11. FIG. 11 is a diagram illustrating the irradiation optical system S1 using the metasurface structural body 60.

As illustrated in FIG. 11, the irradiation optical system S1 is an optical system that irradiates a sample T with light concentrated by using the metasurface structural body 60. The irradiation optical system S1 includes the metasurface structural body 60, a light source 100, and a lens 101. In the example of FIG. 11, in the metasurface structural body 60, the effective refractive indices of the antenna portion 72 constituted by the plurality of antennas 70 and the adjacent portion 66 has the distribution, and thus, the antenna portion 72 functions as the lens. In the sample T illustrated in FIG. 11, a portion to be irradiated (not illustrated) is formed on a front surface Ta, and a back surface Tb thereof is flat. The metasurface structural body 60 is arranged such that, for example, the covering surface 81 abuts (comes in close contact with) the back surface Tb of the sample T.

The light source 100 may be a laser beam source that outputs light such as infrared laser beam. The lens 101 is, for example, a collimating lens. Light outputted from the light source 100 is adjusted to be a parallel beam, and is then inputted to a back surface 63 of the metasurface structural body 60 opposite to the covering surface 81. The parallel beam inputted to the back surface 63 of the metasurface structural body 60 is concentrated by the metasurface structural body 60, and is irradiated to the portion to be irradiated positioned on the front surface Ta of the sample T. Note that, the irradiation optical system S1 is not necessarily limited to the above-mentioned optical system, and for example, a lens, a mirror, or the like may be further arranged as needed.

(Second Application Example of Metasurface Structural Body)

Figure 12:
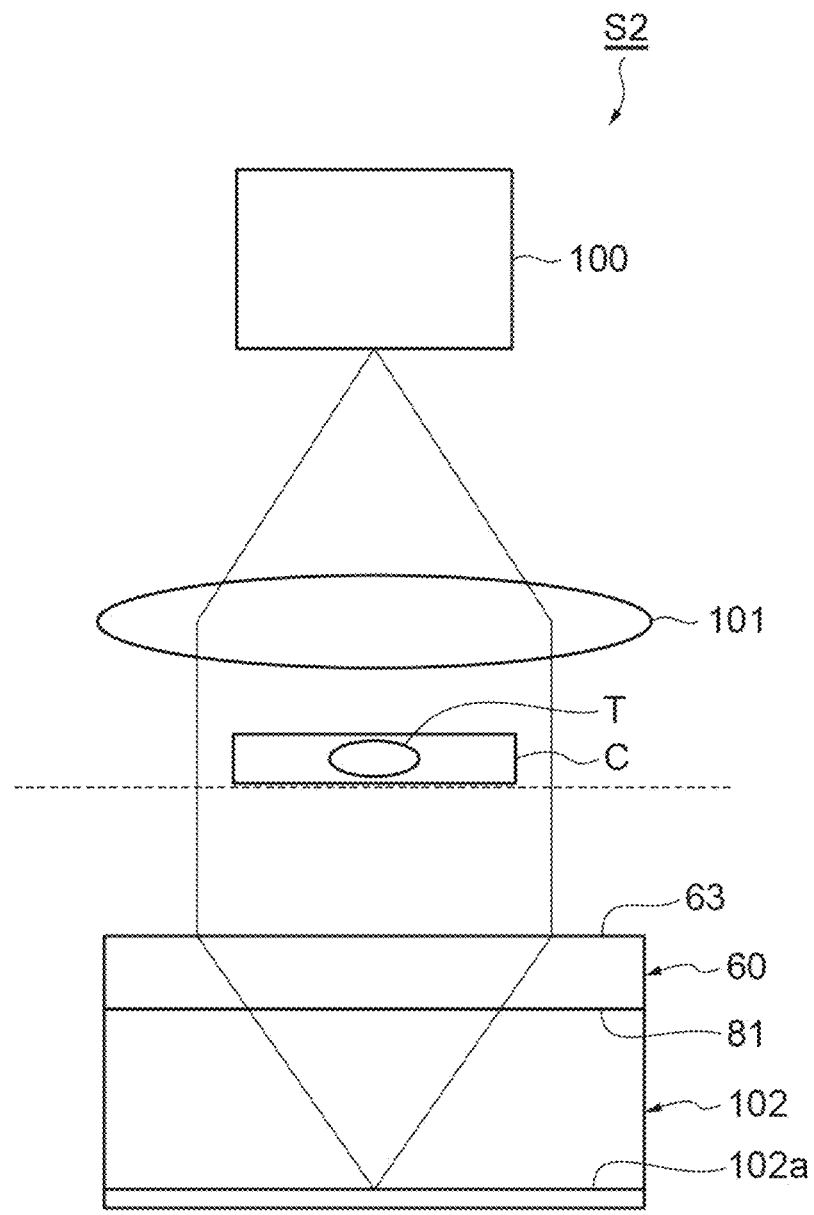
FIG. 12 is a diagram illustrating an observation optical system using the metasurface structural body.

A second application example of the metasurface structural body 60 to an observation optical system S2 will be described with reference to FIG. 12. FIG. 12 is a diagram illustrating the observation optical system S2 using the metasurface structural body 60.

As illustrated in FIG. 12, the observation optical system S2 is an optical system which concentrates the light transmitted through the sample T by using the metasurface structural body 60 and receives (observes) the light by a light receiver 102. The observation optical system S2 includes the metasurface structural body 60, the light source 100, the lens 101, and the light receiver 102. In the example of FIG. 12, in the metasurface structural body 60, the effective refractive indices of the antenna portion 72 constituted by the plurality of antennas 70 and the adjacent portion 66 have the distribution, and thus, the antenna portion 72 functions as the lens. As illustrated in FIG. 12, the sample T may be housed in a cuvette C or the like. In the metasurface structural body 60, for example, the covering surface 81 is placed on the light receiver 102.

The light source 100 may be a laser beam source that outputs light such as infrared laser beam. The lens 101 is, for example, a collimating lens. Light outputted from the light source 100 is adjusted to be a parallel beam, and is then inputted to the back surface 63 of the metasurface structural body 60. The parallel beam inputted to the back surface 63 of the metasurface structural body 60 is concentrated by the metasurface structural body 60, and is irradiated to a light receiving portion 102a of the light receiver 102. Accordingly, the light receiver 102 acquires an image of the sample T. Note that, the observation optical system S2 is not necessarily limited to the above-mentioned optical system, and for example, a lens, a mirror, or the like may be further arranged as needed.

(Third Application Example of Metasurface Structural Body)

Figure 13:
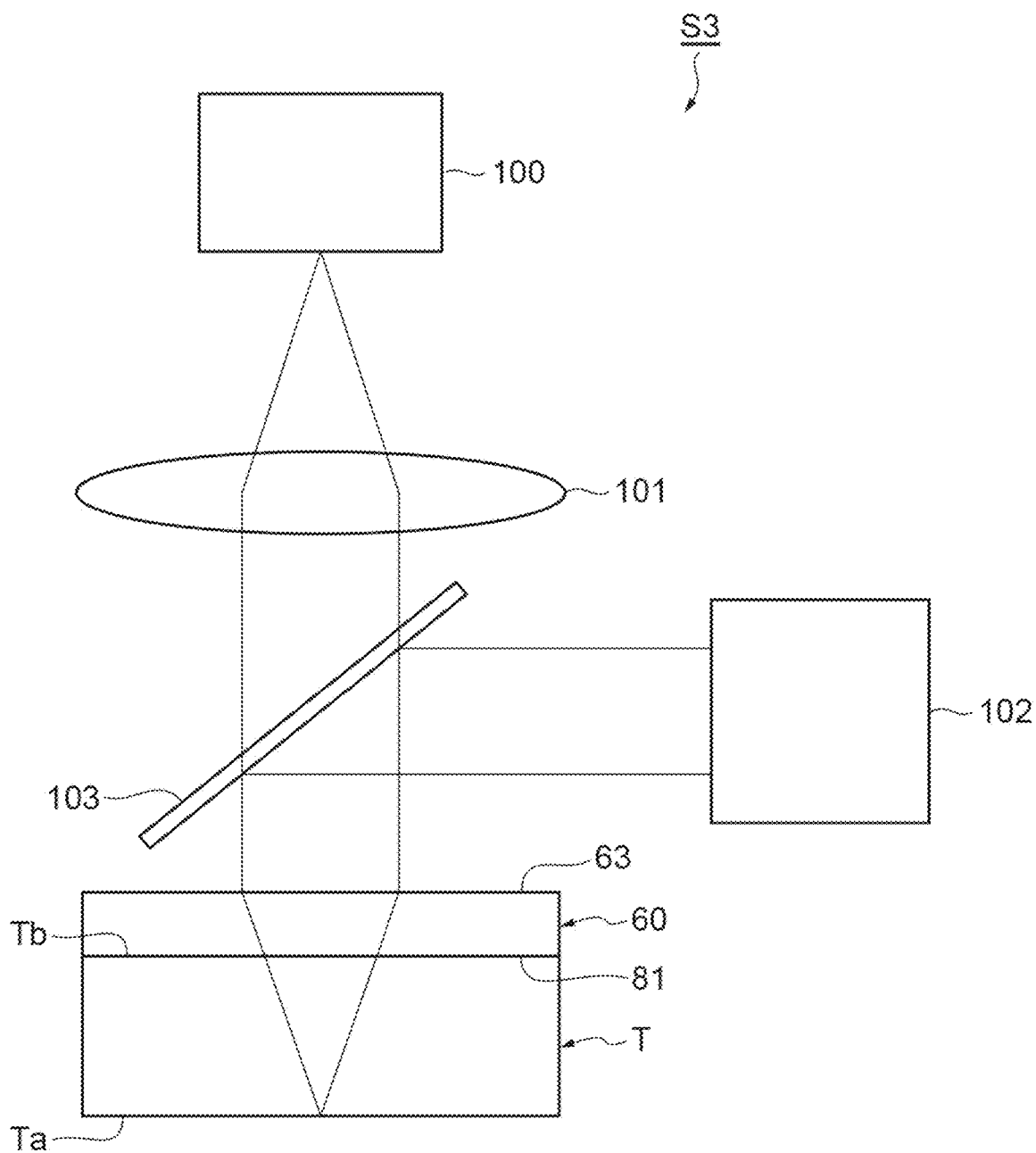
FIG. 13 is a diagram illustrating a light reception and observation optical system using the metasurface structural body.

A third application example of the metasurface structural body 60 to a light reception and observation optical system S3 will be described with reference to FIG. 13. FIG. 13 is a diagram illustrating the light reception and observation optical system S3 using the metasurface structural body 60.

As illustrated in FIG. 13, the light reception and observation optical system S3 is an optical system that irradiates the sample T with light concentrated by using the metasurface structural body 60 and receives (observes) the reflected light by using the light receiver 102 via a beam splitter 103. The light reception and observation optical system S3 includes the metasurface structural body 60, the light source 100, the lens 101, the light receiver 102, and the beam splitter 103. In the example of FIG. 13, in the metasurface structural body 60, the effective refractive indices of the antenna portion 72 constituted by the plurality of antennas 70 and the adjacent portion 66 have the distribution, and thus, the antenna portion 72 functions as the lens. In the sample T illustrated in FIG. 13, a portion to be observed (not illustrated) is formed on the front surface Ta, and the back surface Tb thereof is flat. The metasurface structural body 60 is arranged such that, for example, the covering surface 81 abuts (comes in close contact with) the back surface Tb of the sample T.

The light source 100 may be a laser beam source that outputs light such as infrared laser beam. The lens 101 is, for example, a collimating lens. Light outputted from the light source 100 is adjusted to be a parallel beam, is transmitted through the beam splitter 103, and is inputted to the back surface 63 of the metasurface structural body 60. The parallel beam inputted to the back surface 63 of the metasurface structural body 60 is concentrated by the metasurface structural body 60, and irradiates the portion to be observed positioned on the front surface Ta of the sample T. The parallel beam is reflected at the portion to be observed. The reflected light is returned to the parallel beam by the metasurface structural body 60 again, and is reflected toward the light receiver 102 by the beam splitter 103. Accordingly, the light receiver 102 acquires an image of the sample T. Note that, the light reception and observation optical system S3 is not necessarily limited to the above-mentioned optical system, and for example, a lens, a mirror, or the like may be further arranged as needed.

(Functions and Effects)

As described above, according to the metasurface structural body 60, the plurality of antenna end surfaces 71 and the adjacent-portion end surface 67 constitute the flat surface 61. Thus, the traveling of the transmitted light in irregular directions due to scattering is suppressed. In the metasurface structural body 60, it is not necessary to provide the material of the same type as the base member 68 on the plurality of antenna end surfaces 71. Thus, a degree of freedom in selecting the material of the front surface is high. Accordingly, the metasurface structural body 60 can achieve desired optical characteristics.

In the metasurface structural body 60, the adjacent portion 66 is positioned on the base portion 62 between the plurality of antennas 70. That is, the plurality of antennas 70 are buried in the adjacent portion 66. Accordingly, a surface of each antenna 70 exposed to the outside is reduced. The exposed surface of each antenna 70 is limited in this manner, and thus, oxidation of the front surface of each antenna 70 is suppressed. When the antenna 70 is comprised of metal, the exposed surface of each antenna 70 is limited in this manner, and thus, sulfurization of the front surface of each antenna 70 is suppressed. In other words, each antenna 70 is chemically insensitive. Each antenna 70 is physically supported from the side by the adjacent portion 66. Thus, for example, when the flat surface 61 of the metasurface structural body 60 abuts on the observation object, a force inputted to each antenna 70 is buffered, and each antenna 70 can be protected.

The metasurface structural body 60 has a third refractive index different from the first refractive index and the second refractive index, and includes the covering layer 80 that covers the flat surface 61. For example, when the covering layer 80 is comprised of a material having a higher strength than the antenna end surface 71 and the adjacent-portion end surface 67, the covering layer 80 can function as the protective layer of the flat surface 61. When the covering layer 80 is comprised of a material having a refractive index suitable for the intended use, the interfacial reflection on the flat surface 61 is suppressed, and the transmittance of the transmitted light can be improved. Accordingly, in the metasurface structural body 60, the functionality of the metasurface structural body 60 can be improved by appropriately selecting the material of the covering layer 80.

In the metasurface structural body 60, the plurality of antennas 70 are arranged in the lattice shape when the flat surface 61 is viewed along the direction orthogonal to the flat surface 61. Accordingly, the metasurface structural body 60 can achieve, for example, an example of the optical element, and thus, the desired optical characteristics can be achieved.

In the metasurface structural body 60, the light having the wavelength of, for example, 300 nm or more and 2000 nm or less is inputted to the flat surface 61. In this case, the plurality of antennas 70 are arranged at the pitch shorter than the wavelength when the flat surface 61 is viewed along the direction orthogonal to the flat surface 61. As a result, in the metasurface structural body 60, since the plurality of antennas 70 are arranged at the pitch shorter than the wavelength of the input light, the input light behaves as if the metasurface structural body 60 is the continuous medium. Accordingly, since the metasurface structural body 60 can achieve, for example, an example of the optical element, it is possible to achieve the desired optical characteristics.

In the metasurface structural body 60, when the flat surface 61 is viewed along the direction orthogonal to the flat surface 61, at least one of the size, the shape, and the arrangement pitch of the plurality of antennas 70 is changed within the flat surface 61. Thus, the effective refractive indices of the antenna portion 72 constituted by the plurality of antennas 70 and the adjacent portion 66 have the distribution, and the antenna portion 72 functions as the lens. The metasurface structural body 60 can control the effective refractive indices of the antenna portion 72 by controlling at least one of the size, the shape, and the arrangement pitch of the plurality of antennas 70. Accordingly, the metasurface structural body 60 can set the lens to be thinner than the hemispherical lens of the related art by adjusting the effective refractive indices of the antenna portion 72.

Here, for example, as disclosed in Non Patent Literature 1, in the structural body in which the antenna material is buried by depositing the material of the same type as the substrate on the substrate and on the antenna material, it is considered that the flat surface is formed by polishing the material of the same type as the substrate until an end surface of the antenna material is exposed by a method such as chemical mechanical polishing (CMP). However, in this method, since the end surface of the antenna material is deeply polished in a recess surface shape with respect to the end surface of the substrate (that is, since dishing occurs), the front surface of the structural body constitutes an uneven surface. Accordingly, it is difficult to achieve the desired optical characteristics by this method.

In contrast, according to the method for manufacturing the metasurface structural body 60 according to the present embodiment, the flat surface 61 can be formed without using the method such as chemical mechanical polishing. Since the plurality of antenna end surfaces 71 and the adjacent-portion end surface 67 form the flat surface 61, the traveling of the transmitted light in irregular directions due to scattering is suppressed. In this method for manufacturing the metasurface structural body 60, it is not necessary to provide the material of the same type as the substrate 90 on the plurality of antenna end surfaces 71. Thus, the degree of freedom in selecting the material for the front surface of the structural body is high. Accordingly, in this method of manufacturing the metasurface structural body 60, the desired optical characteristics can be achieved.

The method for manufacturing the metasurface structural body 60 includes the covering step of covering the flat surface 61 by the covering material 99 having the third refractive index different from the first refractive index and different from the second refractive index after the removal step. Accordingly, for example, when the covering layer 80 is comprised of a material having a higher strength than the antenna end surface 71 and the adjacent-portion end surface 67, the covering layer 80 can function as the protective layer for the flat surface 61. When the covering layer 80 is comprised of the material having the refractive index suitable for the intended use, the interfacial reflection on the flat surface 61 is suppressed, and the improvement in the transmittance of the transmitted light can be expected. Accordingly, in this method for manufacturing the metasurface structural body 60, the functionality of the metasurface structural body 60 can be improved by appropriately selecting the material of the covering layer 80.

In the method for manufacturing the metasurface structural body 60, in the etching step, the plurality of recesses 90c are arranged in the lattice shape when the upper surface 90a is viewed along the direction orthogonal to the upper surface 90a of the substrate 90. Accordingly, in the method for manufacturing the metasurface structural body 60, for example, since an example of the optical element can be achieved, the desired optical characteristics can be achieved.

In the method for manufacturing the metasurface structural body 60, the light having the wavelength of, for example, 300 nm or more and 2000 nm or less is inputted to the flat surface 61. In the etching step, the recesses 90c are formed so as to be arranged at the pitch shorter than the predetermined wavelength when the upper surface 90a is viewed along the direction orthogonal to the upper surface 90a of the substrate 90. As described above, in the method for manufacturing the metasurface structural body 60, since the antennas 70 are arranged at the pitch shorter than the wavelength of the input light, the input light behaves as if the metasurface structural body 60 is the continuous medium. Accordingly, in the method for manufacturing the metasurface structural body 60, for example, since an example of the optical element can be achieved, the desired optical characteristics can be achieved.

In the method for manufacturing the metasurface structural body 60, in the etching step, the recesses 90c are formed such that at least one of the size, the shape, and the arrangement pitch of the plurality of recesses 90c is changed within the upper surface 90a of the substrate 90 when the upper surface 90a is viewed along the direction orthogonal to the upper surface 90a of the substrate 90. Here, in the method for manufacturing the metasurface structural body 60, the effective refractive indices of the antenna portion 72 can be controlled by controlling at least one of the size, the shape, and the arrangement pitch of the plurality of antennas 70. In the method for manufacturing the metasurface structural body 60, the effective refractive indices of the antenna portion 72 are adjusted, and thus, the lens can be set to be thinner than the hemispherical lens of the related art.

(Modification)

The above-described embodiments can be implemented in various forms by various changes and improvements based on the knowledge of those skilled in the art.

Figure 14:
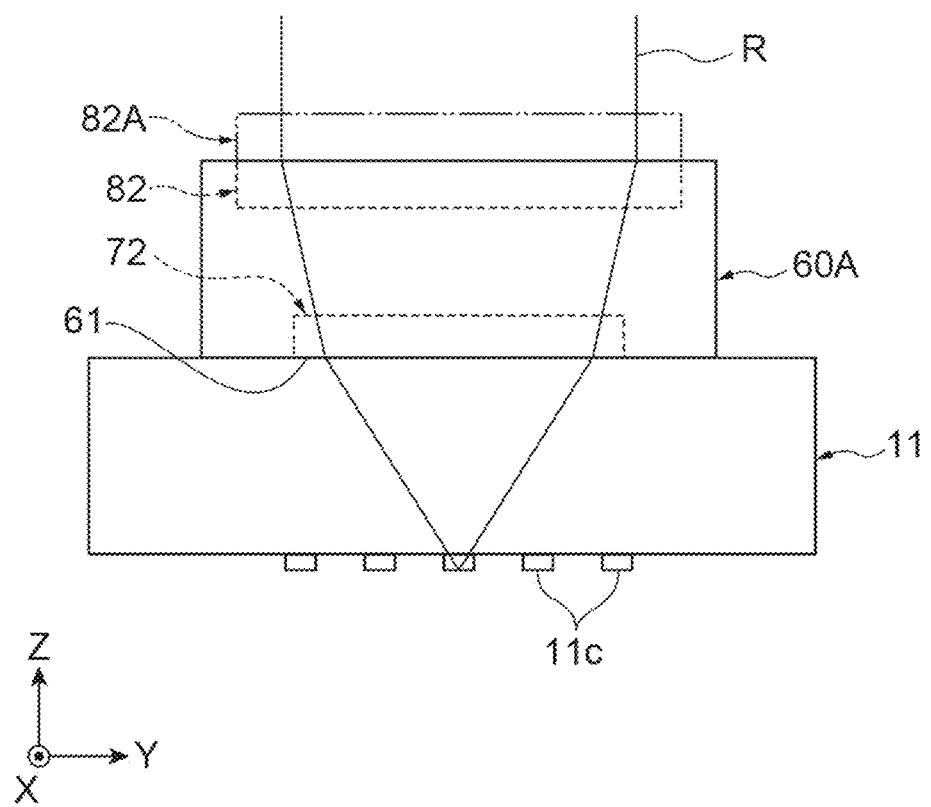
FIG. 14 is a front view illustrating a metasurface structural body according to a modification.
Figure 15A:
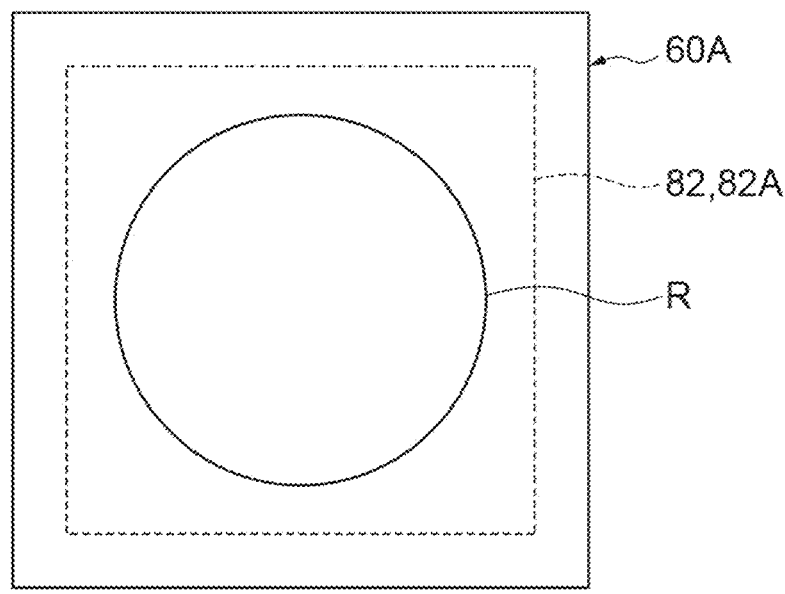
FIGS. 15A and 15B are plan views illustrating each antenna portion of the metasurface structural body of FIG. 14.
Figure 15B:
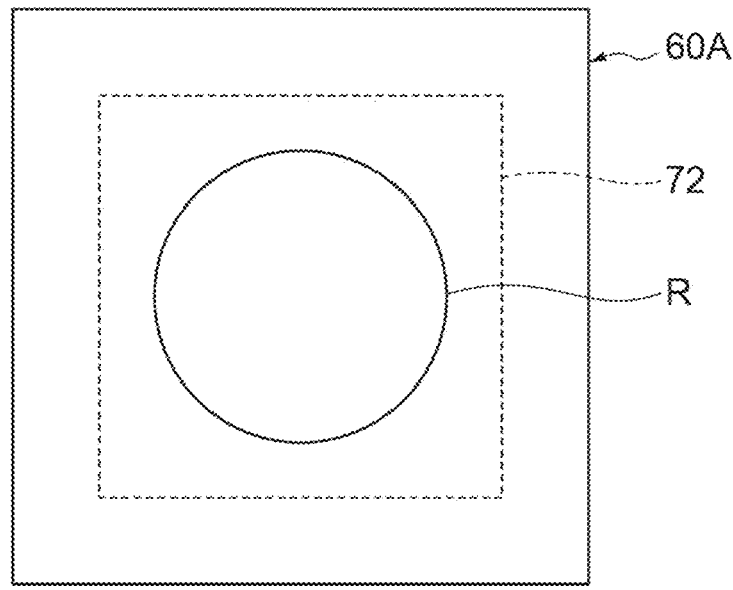
Figure 15B:
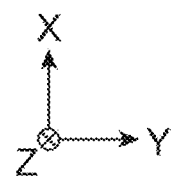

FIG. 14 is a front view illustrating a metasurface structural body 60A according to a modification. FIGS. 15A and 15B are plan views illustrating each antenna portion of the metasurface structural body 60A of FIG. 14. The metasurface structural body 60A may include another antenna portion 82 having the same configuration as the antenna portion 72 opposite to the flat surface 61 as indicated by a dashed line in FIG. 14. The other antenna portion 82 is buried in the base member 68 similarly to the antenna portion 72. Alternatively, the metasurface structural body 60A may include still another antenna portion 82A formed on the base member 68 opposite to the flat surface 61 as indicated by a dashed double-dotted line in FIG. 14 instead of the other antenna portion 82. The still another antenna portion 82A may be constituted by, for example, a plurality of antennas erected on the base member 68, and an air layer may be formed between the plurality of antennas. In FIGS. 14 and 15A to 15B, the metasurface structural body 60A functions as the lens, and the integrated circuit 11c abuts on the back surface of the semiconductor device 11 formed on the front surface. As stated above, when the metasurface structural body 60A functions as the lens, the number of lenses is larger than in the metasurface structural body 60 having only the antenna portion 72. Thus, the light R is concentrated by each antenna, and the magnification is further expanded. Note that, as illustrated in FIGS. 15A and 15B, when the antenna portion 72 and the other antenna portions 82 and 82A are viewed along the Z-direction, the area of the above-mentioned other antenna portions 82 and 82A may be larger than the area of the antenna portion 72. Accordingly, since it is not necessary to form the antenna portion 72 in the region in which the light R is not inputted, the manufacturing becomes easy.

In the above-described embodiment, the shape of the metasurface structural body 60 when viewed along the Z-direction is not particularly limited, and may be, for example, a circular shape.

In the above-described embodiment, the shape of the antenna 70 is not particularly limited. For example, the antenna 70 may have a shape corresponding to the method of the metasurface structure of the antenna portion 72.

In the above-described embodiment, the material of the antenna 70 may not be silicon. For example, the material of the antenna 70 may be germanium, gold, silver, chromium, titanium oxide ($TiO_2$), silicon nitride, or the like. Even in these cases, the effective refractive indices of the antenna portion 72 can be set to suitable values. Note that, silicon, germanium, or the like may be used as the material of the antenna 70 when the light inputted to the flat surface 61 is light in a near infrared band, and titanium oxide, silicon nitride, or the like may be used when the light inputted to the flat surface 61 is light in a visible region.

In the above-described embodiment, the antennas 70 are not limited to the matrix shape when the flat surface 61 is viewed along the Z-direction, and may be regularly arranged in a honeycomb shape, a radial shape, or the like. Alternatively, the antennas 70 may be arranged irregularly when the flat surface 61 is viewed along the Z-direction.

In the above-described embodiment, the base portion 62 and the adjacent portion 66 may not be integrally formed. That is, the base portion 62 and the adjacent portion 66 may be formed as physically separated members. In this case, at least only the adjacent portion 66 may have the second refractive index, and the base portion 62 may not have the second refractive index.

In the above-described embodiment, the metasurface structural body 60 may not include the covering layer 80. The metasurface structural body 60 may not have the thin film shape or the flat plate shape.

In the above-described embodiment, the metasurface structural body 60 may function as the optical element by including the plurality of arranged antennas 70, and may not necessarily function as the optical element similarly to the metasurface structural body 60 in the above-described embodiment. That is, in the metasurface structural body 60, the effective refractive indices of the antenna portion 72 may have the distribution so as to function as an optical element other than the lens. For example, the metasurface structural body 60 may function as an optical element such as a diffraction grating or a hologram.

The above-described embodiment may include at least a heating step of heating the antenna material 93 after the deposition step (for example, after the deposition step and before the removal step, after the removal step and before the covering step, or after the covering step). Accordingly, the flatness of the flat surface can be improved.

REFERENCE SIGNS LIST

60 . . . Metasurface structural body; 61 . . . Flat surface (first surface); 62 . . . Base portion; 66 . . . Adjacent portion; 67 . . . Adjacent-portion end surface; 68 . . . Base member; 70 . . . Antenna; 71 . . . Antenna end surface; 80 . . . Covering layer; 90 . . . Substrate; 90*a* . . . Upper surface; 90*b* . . . Lower surface (second surface); 90*c* . . . Recess; 91, 95 . . . Mask layer; 92, 98 . . . Opening portion; 93 . . . Antenna material; 93*a* . . . Upper surface; and 99 . . . Covering material.

The invention claimed is:

1. A metasurface structural body that has a first surface and a second surface opposing each other and has a plurality of fine structures arranged along the first surface, the metasurface structural body comprising:

a base member including a base portion provided between the first surface and the second surface, and an adjacent portion provided between the first surface and the base portion; and a plurality of antennas provided as the plurality of fine structures between the first surface and the base portion, the plurality of antennas each having a first refractive index and an antenna end surface constituting a part of the first surface, wherein the adjacent portion is provided between the first surface and the base portion such that a part of the adjacent portion is positioned between the plurality of antennas, the adjacent portion having a second refractive index different from the first refractive index and an adjacent-portion end surface constituting a remaining part of the first surface, and the plurality of antenna end surfaces and the adjacent-portion end surface constitute a flat surface as the first surface.

2. The metasurface structural body according to claim 1, further comprising: a covering layer having a third refractive index different from the first refractive index and the second refractive index, the covering layer being provided on a side opposite to the base portion with respect to the adjacent portion so as to cover the first surface.

3. The metasurface structural body according to claim 1, wherein the plurality of antennas are arranged such that the antenna end surfaces of the plurality of antennas form a two-dimensional matrix on the first surface.

4. The metasurface structural body according to claim 1, wherein an antenna portion constituted by the plurality of antennas and the adjacent portion is formed such that a one-dimensional arrangement formed by the antenna end surfaces of which centers of gravity are positioned on at least one reference line on the first surface includes an arrangement pattern in which at least one of a size of the antenna end surface, a shape of the antenna end surface, and an arrangement pitch is changed along the reference line.

5. The metasurface structural body according to claim 4, wherein light having a wavelength in a range of 300 nm or more and 2000 nm or less is inputted to the first surface, and the plurality of antennas are arranged such that the arrangement pitch is shorter than the wavelength.

6. A method for manufacturing a metasurface structural body having a plurality of two-dimensionally arranged fine structures, the method comprising:

preparing a substrate having an upper surface and a lower surface opposing each other and forming a mask layer on the upper surface of the substrate;

forming a plurality of opening portions in the mask layer on the substrate;

forming a plurality of recesses in the substrate by etching the substrate through the plurality of opening portions;

depositing an antenna material having a refractive index different from a refractive index of the substrate on the substrate through the plurality of opening portions; and removing the mask layer, wherein
in the depositing, the antenna material is deposited on the substrate through the plurality of opening portions such that a flat surface is formed by both a region of the upper surface of the substrate covered by the mask layer and an upper surface of the antenna material exposed by the plurality of opening portions.

7. The method for manufacturing a metasurface structural body according to claim 6, further comprising: covering the flat surface by a covering material having a refractive index different from both the refractive index of the substrate and the refractive index of the antenna material after the removing.

8. The method for manufacturing a metasurface structural body according to claim 6, wherein in the forming the plurality of opening portions, the plurality of opening portions are formed in the mask layer such that the plurality of recesses are formed on the upper surface of the substrate in a two-dimensional matrix shape.

9. The method for manufacturing a metasurface structural body according to claim 6, wherein in the forming the plurality of opening portions, the plurality of opening portions are formed in the mask layer such that a one-dimensional arrangement formed by openings of which centers of gravity are positioned on at least one reference line on the upper surface among the openings of the plurality of recesses includes an arrangement pattern in which at least one of a size of the opening, a shape of the opening, and an arrangement pitch is changed along the reference line.

10. The method for manufacturing a metasurface structural body according to claim 9, wherein
light having a wavelength in a range of 300 nm or more and 2000 nm or less is inputted to the flat surface, and
in the forming the plurality of opening portions, the plurality of opening portions are formed in the mask layer such that the plurality of recesses are arranged in a state in which the arrangement pitch is shorter than the wavelength.

* * * * *